US011025317B2

(12) United States Patent
Mo et al.

(10) Patent No.: US 11,025,317 B2
(45) Date of Patent: Jun. 1, 2021

(54) ADAPTATION OF HIERARCHICAL CODEBOOKS

(71) Applicant: Samsung Electronics Co., Ltd., Suwon-si (KR)

(72) Inventors: Jianhua Mo, Allen, TX (US); Boon Loong Ng, Plano, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/865,099

(22) Filed: May 1, 2020

(65) Prior Publication Data
US 2020/0358498 A1 Nov. 12, 2020

Related U.S. Application Data

(60) Provisional application No. 62/889,150, filed on Aug. 20, 2019, provisional application No. 62/861,730, filed on Jun. 14, 2019, provisional application No. 62/845,451, filed on May 9, 2019.

(51) Int. Cl.
*H04B 7/0456* (2017.01)

(52) U.S. Cl.
CPC .................. *H04B 7/0482* (2013.01)

(58) Field of Classification Search
CPC ..... H04B 7/0482; H04B 7/088; H04B 7/0695
See application file for complete search history.

(56) References Cited

U.S. PATENT DOCUMENTS

| 6,345,126 | B1* | 2/2002 | Vishwanath | G06T 9/008 375/240.22 |
| 2011/0128939 | A1* | 6/2011 | Lim | H04B 7/063 370/335 |
| 2012/0314611 | A1 | 12/2012 | Baker et al. | |
| 2013/0088981 | A1* | 4/2013 | Lv | H04W 72/044 370/252 |
| 2013/0089165 | A1 | 4/2013 | Chen et al. | |

(Continued)

OTHER PUBLICATIONS

Swinbank, Richard, et al., "Fibonacci grids: A novel approach to global modelling," Quarterly Journal of the Royal Meteorological Society, vol. 132, No. 619, pp. 1769-1793, 2006.

(Continued)

*Primary Examiner* — Kenneth T Lam

(57) ABSTRACT

An electronic device, a method, and computer readable media for adapting a hierarchical codebook. The electronic device includes a memory for storing a hierarchical codebook and a processor operably connected to the memory, which is configured to determine usage probabilities for codewords in the hierarchical codebook. The codewords are represented by nodes assigned to one of a plurality of tiers of the hierarchical codebook based on a tier identifier. The processor is also configured to change a structure of the hierarchical codebook based on the usage probabilities so that nodes associated with codewords having relatively higher usage probabilities are located closer to a root node than nodes associated with codewords having relatively lower usage probabilities, and select a codeword from the hierarchical codebook for use in wireless communication. The codeword is selected by a codeword selection procedure performed on the changed structure of the hierarchical codebook.

20 Claims, 22 Drawing Sheets

(56) References Cited

U.S. PATENT DOCUMENTS

| | | | |
|---|---|---|---|
| 2014/0192918 A1* | 7/2014 | Park | H04B 7/0486 |
| | | | 375/267 |
| 2014/0321563 A1 | 10/2014 | Park et al. | |
| 2017/0078004 A1 | 3/2017 | Capar et al. | |
| 2018/0167115 A1 | 6/2018 | Zhu et al. | |
| 2018/0248596 A1* | 8/2018 | Xiao | H04B 7/0456 |
| 2019/0222275 A1 | 7/2019 | Mo et al. | |
| 2020/0358512 A1* | 11/2020 | Zhan | H04B 7/0695 |

OTHER PUBLICATIONS

Xiao, Zhenyu, et al., "Codebook Design for Millimeter-Wave Channel Estimation With Hybrid Precoding Structure," in IEEE Transactions on Wireless Communications, vol. 16, No. 1, pp. 141-153, Jan. 2017.

International Search Report of the International Searching Authority in connection with International Patent Application No. PCT/KR2020/006180 dated Aug. 20, 2020, 3 pages.

\* cited by examiner

ADAPTATION OF HIERARCHICAL CODEBOOKS

CROSS-REFERENCE TO RELATED APPLICATION AND CLAIM OF PRIORITY

This application claims priority under 35 U.S.C. § 119(e) to U.S. Provisional Patent Application No. 62/845,451 filed on May 9, 2019; to U.S. Provisional Patent Application No. 62/861,730 filed on Jun. 14, 2019; and to U.S. Provisional Patent Application No. 62/889,150 filed on Aug. 20, 2019. The above-identified provisional patent applications are hereby incorporated by reference in its entirety.

TECHNICAL FIELD

The present disclosure relates to a pre-$5^{th}$-Generation (5G) or 5G communication system to be provided for supporting higher data rates Beyond $4^{th}$-Generation (4G) communication system such as Long-Term Evolution (LTE). In particular, aspects of the present disclosure relate to designing and adapting hierarchical codebooks.

BACKGROUND

To meet the increased demand for wireless data services since the deployment of 4G communication systems, efforts have been made to develop an improved 5G or pre-5G communication system. Therefore, the 5G or pre-5G communication system is also called a 'Beyond 4G Network' or a 'Post LTE System'. A 5G communication system can be implemented in higher frequency (mmWave) bands, e.g., 60 GHz bands, compared to a 4G communication system to provide higher data rates. To decrease a propagation loss of radio waves and increase a transmission distance, beam-forming, massive multiple-input multiple-output (MIMO), Full Dimensional MIMO (FD-MIMO), array antenna, analog beamforming, and large-scale antenna techniques are considered in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large-scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

SUMMARY

Embodiments of the present disclosure include an electronic device, a method, and computer readable media for adapting a hierarchical codebook. One embodiment is directed to an electronic device, such as a user equipment (UE) or a base station (BS) that includes a memory configured to store a hierarchical codebook and a processor operably connected to the memory. The processor is configured to determine usage probabilities for codewords in the hierarchical codebook. The codewords are represented by nodes assigned to one of a plurality of tiers of the hierarchical codebook based on a tier identifier. The processor is also configured to change a structure of the hierarchical codebook based on the usage probabilities so that nodes associated with codewords having relatively higher usage probabilities are located closer to a root node than nodes associated with codewords having relatively lower usage probabilities, and select a codeword from the hierarchical codebook for use in wireless communication, wherein the codeword is selected by a codeword selection procedure performed on the changed structure of the hierarchical codebook.

Another embodiment is directed to a method that includes the steps of determining usage probabilities for codewords in the hierarchical codebook. The codewords are represented by nodes assigned to one of a plurality of tiers of the hierarchical codebook based on a tier identifier. The method also includes changing a structure of the hierarchical codebook based on the usage probabilities so that nodes associated with codewords having relatively higher usage probabilities are located closer to a root node than nodes associated with codewords having relatively lower usage probabilities. The method also includes selecting a codeword from the hierarchical codebook for use in wireless communication. The codeword is selected by a codeword selection procedure performed on the changed structure of the hierarchical codebook.

Yet another embodiment is directed to non-transitory, computer-readable media storing instructions that, when executed by a processor of an electronic device, cause the electronic device to determine usage probabilities for codewords in the hierarchical codebook. The codewords are represented by nodes assigned to one of a plurality of tiers of the hierarchical codebook based on a tier identifier. When executed, the instructions also cause the electronic device to change a structure of the hierarchical codebook based on the usage probabilities so that nodes associated with codewords having relatively higher usage probabilities are located closer to a root node than nodes associated with codewords having relatively lower usage probabilities, and select a codeword from the hierarchical codebook for use in wireless communication. The codeword is selected by a codeword selection procedure performed on the changed structure of the hierarchical codebook.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C. Likewise, the term "set" means one or more. Accordingly, a set of items can be a single item or a collection of two or more items.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of this disclosure and its advantages, reference is now made to the following description, taken in conjunction with the accompanying drawings, in which.

DETAILED DESCRIPTION

The figures included herein, and the various embodiments used to describe the principles of the present disclosure are by way of illustration only and should not be construed in any way to limit the scope of the disclosure. Further, those skilled in the art will understand that the principles of the present disclosure may be implemented in any suitably arranged wireless communication system.

The following documents are hereby incorporated by reference into the present disclosure as if fully set forth herein: U.S. patent application Ser. No. 16/224,531, "Methods of beam codebook generation for the 5G terminal", hereinafter "REF 1"; R. Swinbank and R. J. Purser, "Fibonacci grids: A novel approach to global modelling," Quarterly Journal of the Royal Meteorological Society, vol. 132, no. 619, pp. 1769-1793, 2006, hereinafter "REF 2"; and Z. Xiao, P. Xia and X. Xia, "Codebook Design for Millimeter-Wave Channel Estimation With Hybrid Precoding Structure," in *IEEE Transactions on Wireless Communications*, vol. 16, no. 1, pp. 141-153, January 2017, hereinafter "REF 3".

In 5G or the other wireless systems, mmWave is a major band on which high throughputs can be achieved. The propagation on the mmWave bands suffers more significant path loss than that in the sub-6 GHz bands. To compensate the increased path loss, multiple antenna elements can be simultaneously activated to form a narrow beam with high gain. The narrow beamwidth, however, incurs an overhead for aligning the beam direction to the best signal transmission/reception directions.

Novel aspects of this disclosure recognize that hierarchical codebooks can be applied to facilitate a fast beam alignment, namely, first transmit or receive with a wide beam, then with an intermediate wide beam, then with a narrow beam, etc. It is noted that the disclosure can also be applied to other wireless systems where beamforming is applied, such as terahertz (THz) systems, and massive MIMO system in sub-6 GHz.

Additionally, novel aspects of this disclosure present a generic method capable of designing a beam codeword for a wide range of requirements, including the wide beam design. Novel aspects of this disclosure also present a method of generating a beam codebook consisting of more than one beams, as well as generation of hierarchical codebooks. Lastly, novel aspects of this disclosure also provide for a method of adapting a hierarchical codebook based on usage patterns.

Figure 1:
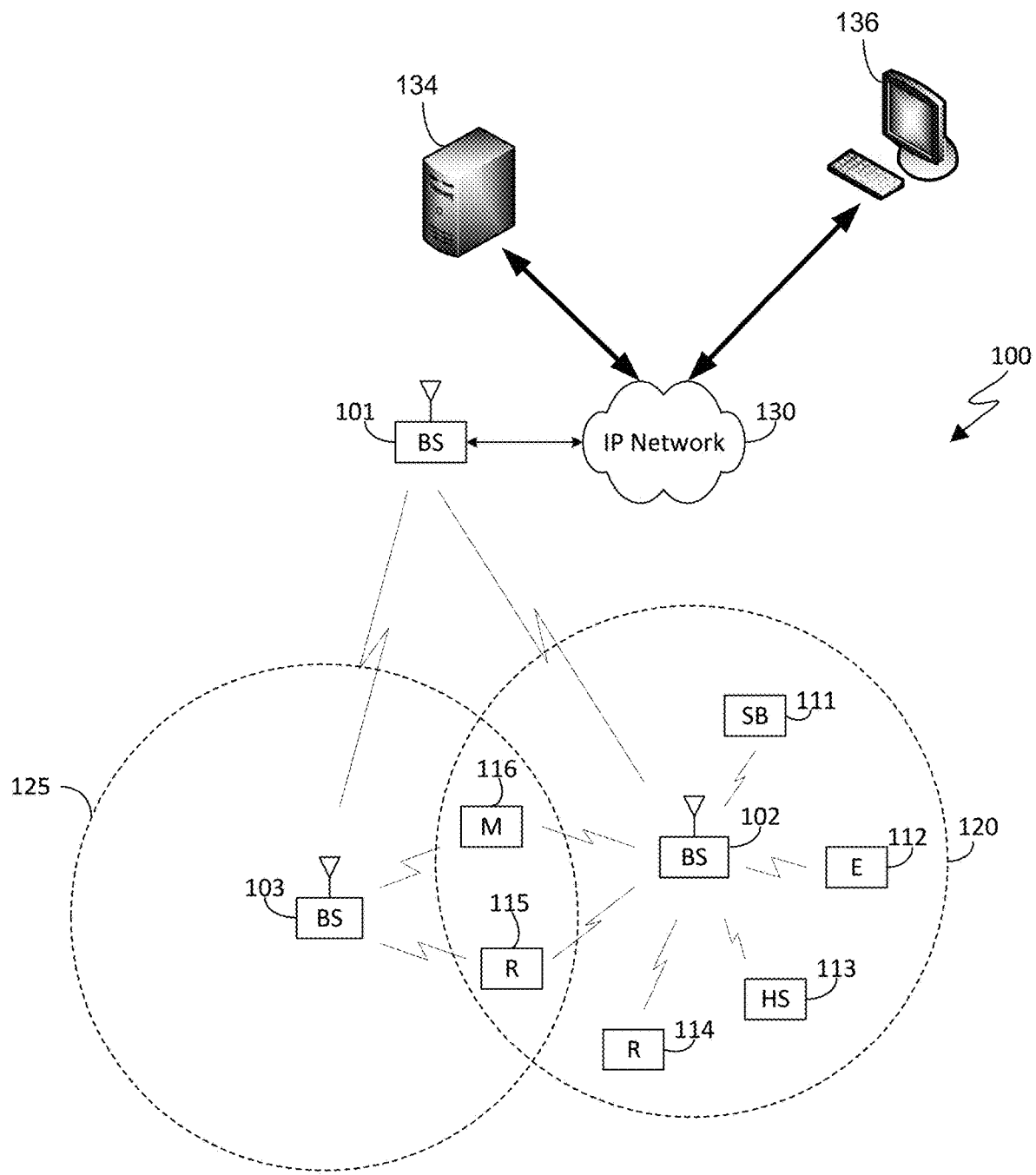
FIG. 1 illustrates an exemplary networked computing system according to various embodiments of this disclosure.

FIG. 1 illustrates an exemplary networked computing system according to various embodiments of this disclosure. The depicted embodiment is for illustration only and other embodiments could be used without departing from the scope of this disclosure.

In FIG. 1, the wireless network 100 includes an gNodeB (gNB) 101, an gNB 102, and an gNB 103. The gNB 101 communicates with the gNB 102 and the gNB 103. The gNB 101 also communicates with at least one Internet Protocol (IP) network 130, such as the Internet, a proprietary IP network, or other data network.

The gNB 102 provides wireless broadband access to the network 130 for a first plurality of user equipments (UEs) within a coverage area 120 of the gNB 102. The first plurality of UEs includes a UE 111, which may be located in a small business (SB); a UE 112, which may be located in an enterprise (E); a UE 113, which may be located in a WIFI hotspot (HS); a UE 114, which may be located in a first residence (R); a UE 115, which may be located in a second residence (R); and a UE 116, which may be a mobile device (M) like a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116.

Depending on the network type, the term 'base station' can refer to any component (or collection of components) configured to provide wireless access to a network, such as transmit point (TP), transmit-receive point (TRP), a gNB, a macrocell, a femtocell, a WIFI access point (AP), or other wirelessly enabled devices. Base stations may provide wireless access in accordance with one or more wireless communication protocols, e.g., 5G 3GPP New Radio Interface/Access (NR), long term evolution (LTE), LTE advanced (LTE-A), High Speed Packet Access (HSPA), Wi-Fi 802.11a/b/g/n/ac, etc. Also, depending on the network type, other well-known terms may be used instead of "user equipment" or "UE," such as "mobile station," "subscriber station," "remote terminal," "wireless terminal," or "user device." For the sake of convenience, the terms "user equipment" and "UE" are used in this patent document to refer to remote wireless equipment that wirelessly accesses an gNB, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

In some embodiments, the network 130 facilitates communications between at least one server 134 and various client devices, such as client device 136. Server 134 includes any suitable computing or processing device that can provide computing services for one or more client devices. Server 134 could, for example, include one or more processing devices, one or more memories storing instructions and data, and one or more network interfaces facilitating communication over the network 130.

Client device 136 represents any suitable computing or processing device that interacts with at least one server or other computing device(s) over the network 130. In this example, the client device is represented as a desktop computer, but other non-limiting examples of client devices can include a mobile telephone, laptop computer, or tablet computer. However, any other or additional client devices could be used in the computing system 100.

In this example, client devices can communicate indirectly with the network 130. For example, some client devices can communicate via one or more base stations, such as cellular base stations or eNodeBs. Also, client devices can communicate via one or more wireless access points (not shown), such as IEEE 802.11 wireless access points. Note that these are for illustration only and that each client device could communicate directly with the network 130 or indirectly with the network 130 via any suitable intermediate device(s) or network(s).

As described in more detail below, wireless network 100 can be a 5G communication system in which a UE and/or BS can adapt a hierarchical codebook for use in wireless communication with each other. In addition, wireless network 100 can enable a computing device, such as server 134, to design and disseminate hierarchical codebooks to electronic devices, such as UE 116 and BS 101, for wireless communication.

Although FIG. 1 illustrates one example of a wireless network 100, various changes may be made to FIG. 1. For example, the wireless network 100 could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNB 101, 102, and/or 103 could provide access to other or additional external networks, such as external telephone networks or other types of data networks.

Figure 2:
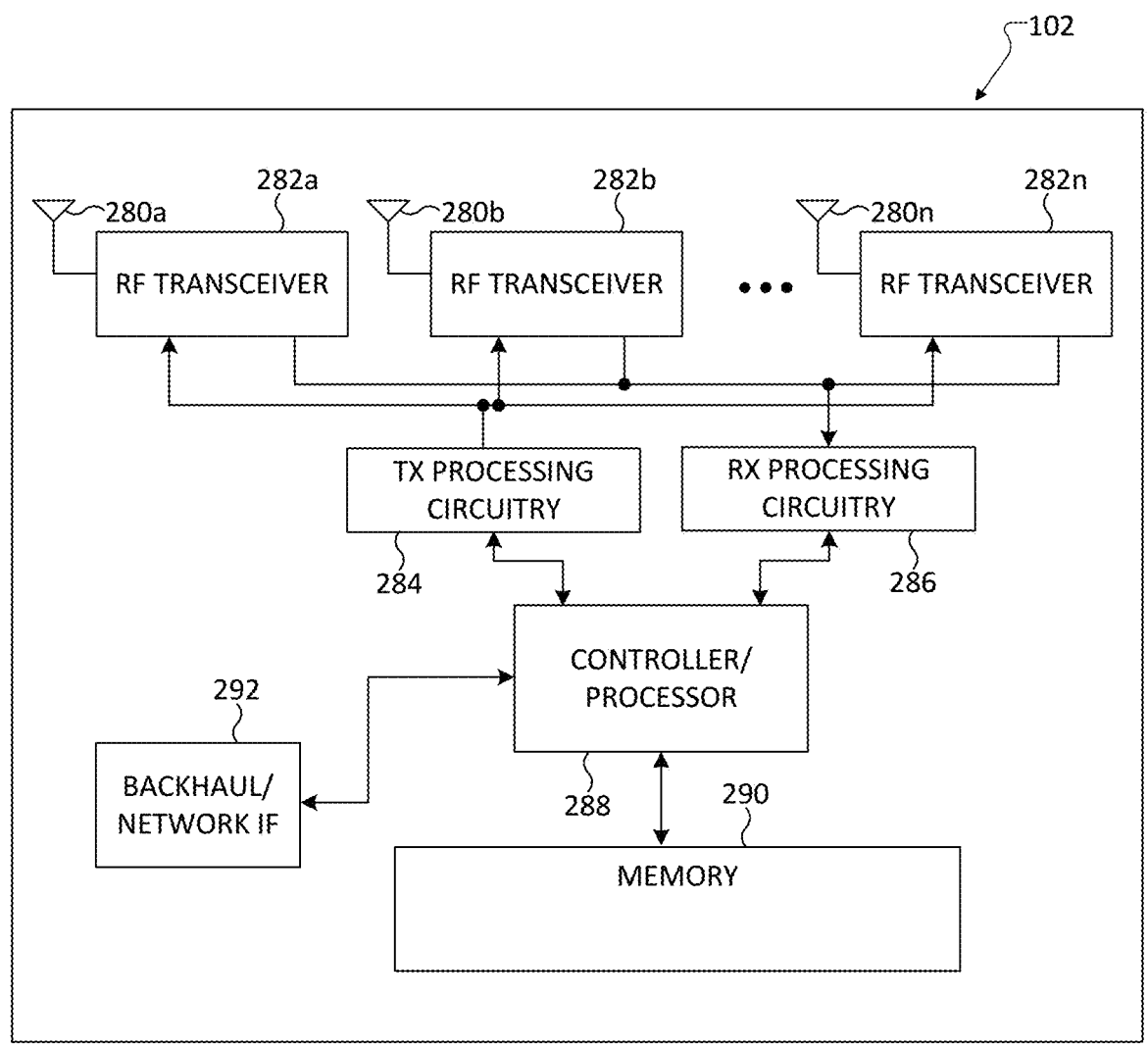
FIG. 2 illustrates an exemplary base station (BS) in the networked computing system according to various embodiments of this disclosure.

FIG. 2 illustrates an exemplary base station (BS) according to various embodiments of this disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of this disclosure to any particular implementation of an gNB.

As shown in FIG. 2, the gNB 102 includes multiple antennas 280a-280n, multiple RF transceivers 282a-282n, transmit (TX) processing circuitry 284, and receive (RX) processing circuitry 286. The gNB 102 also includes a controller/processor 288, a memory 290, and a backhaul or network interface 292.

The RF transceivers 282a-282n receive, from the antennas 280a-280n, incoming RF signals, such as signals transmitted by UEs in the network 100. The RF transceivers 282a-282n down-convert the incoming RF signals to generate IF or baseband signals. The IF or baseband signals are sent to the RX processing circuitry 286, which generates processed baseband signals by filtering, decoding, and/or digitizing the baseband or IF signals. The RX processing circuitry 286 transmits the processed baseband signals to the controller/processor 288 for further processing.

The TX processing circuitry 284 receives analog or digital data (such as voice data, web data, e-mail, or interactive video game data) from the controller/processor 288. The TX processing circuitry 284 encodes, multiplexes, and/or digitizes the outgoing baseband data to generate processed baseband or IF signals. The RF transceivers 282a-282n receive the outgoing processed baseband or IF signals from the TX processing circuitry 284 and up-converts the baseband or IF signals to RF signals that are transmitted via the antennas 280a-280n.

The controller/processor 288 can include one or more processors or other processing devices that control the overall operation of the gNB 102. For example, the controller/processor 288 could control the reception of forward channel signals and the transmission of reverse channel signals by the RF transceivers 282a-282n, the RX processing circuitry 286, and the TX processing circuitry 284 in accordance with well-known principles. The controller/processor 288 could support additional functions as well, such as more advanced wireless communication functions. For instance, the controller/processor 288 could support beam forming or directional routing operations in which outgoing signals from multiple antennas 280a-280n are weighted differently to effectively steer the outgoing signals in a desired direction. Any of a wide variety of other functions could be supported in the gNB 102 by the controller/processor 288. In some embodiments, the controller/processor 288 includes at least one microprocessor or microcontroller.

The controller/processor 288 is also capable of executing programs and other processes resident in the memory 290, such as a basic OS. The controller/processor 288 can move data into or out of the memory 290 as required by an executing process.

The controller/processor 288 is also coupled to the backhaul or network interface 292. The backhaul or network interface 292 allows the gNB 102 to communicate with other devices or systems over a backhaul connection or over a network. The interface 292 could support communications over any suitable wired or wireless connection(s). For example, when the gNB 102 is implemented as part of a cellular communication system (such as one supporting 5G, LTE, or LTE-A), the interface 292 could allow the gNB 102 to communicate with other gNBs over a wired or wireless backhaul connection. When the gNB 102 is implemented as an access point, the interface 292 could allow the gNB 102 to communicate over a wired or wireless local area network or over a wired or wireless connection to a larger network (such as the Internet). The interface 292 includes any suitable structure supporting communications over a wired or wireless connection, such as an Ethernet or RF transceiver.

The memory 290 is coupled to the controller/processor 288. Part of the memory 290 could include a RAM, and another part of the memory 290 could include a Flash memory or other ROM.

As described in more detail below, the BS 102 can receive hierarchical codebooks generated by a networked computing device, such as server 134, for use in communicating over networked communication system 100. Additionally, the BS 102 can adapt the hierarchical codebook based on usage patterns updated over time. The adapted hierarchical codebook reduces time necessary to perform a beam search procedure on the adapted hierarchical codebook.

Although FIG. 2 illustrates one example of gNB 102, various changes may be made to FIG. 2. For example, the gNB 102 could include any number of each component shown in FIG. 2. As a particular example, an access point could include a number of interfaces 292, and the controller/processor 288 could support routing functions to route data between different network addresses. As another particular example, while shown as including a single instance of TX processing circuitry 284 and a single instance of RX processing circuitry 286, the gNB 102 could include multiple instances of each (such as one per RF transceiver). Also, various components in FIG. 2 could be combined, further subdivided, or omitted and additional components could be added according to particular needs.

Figure 3:
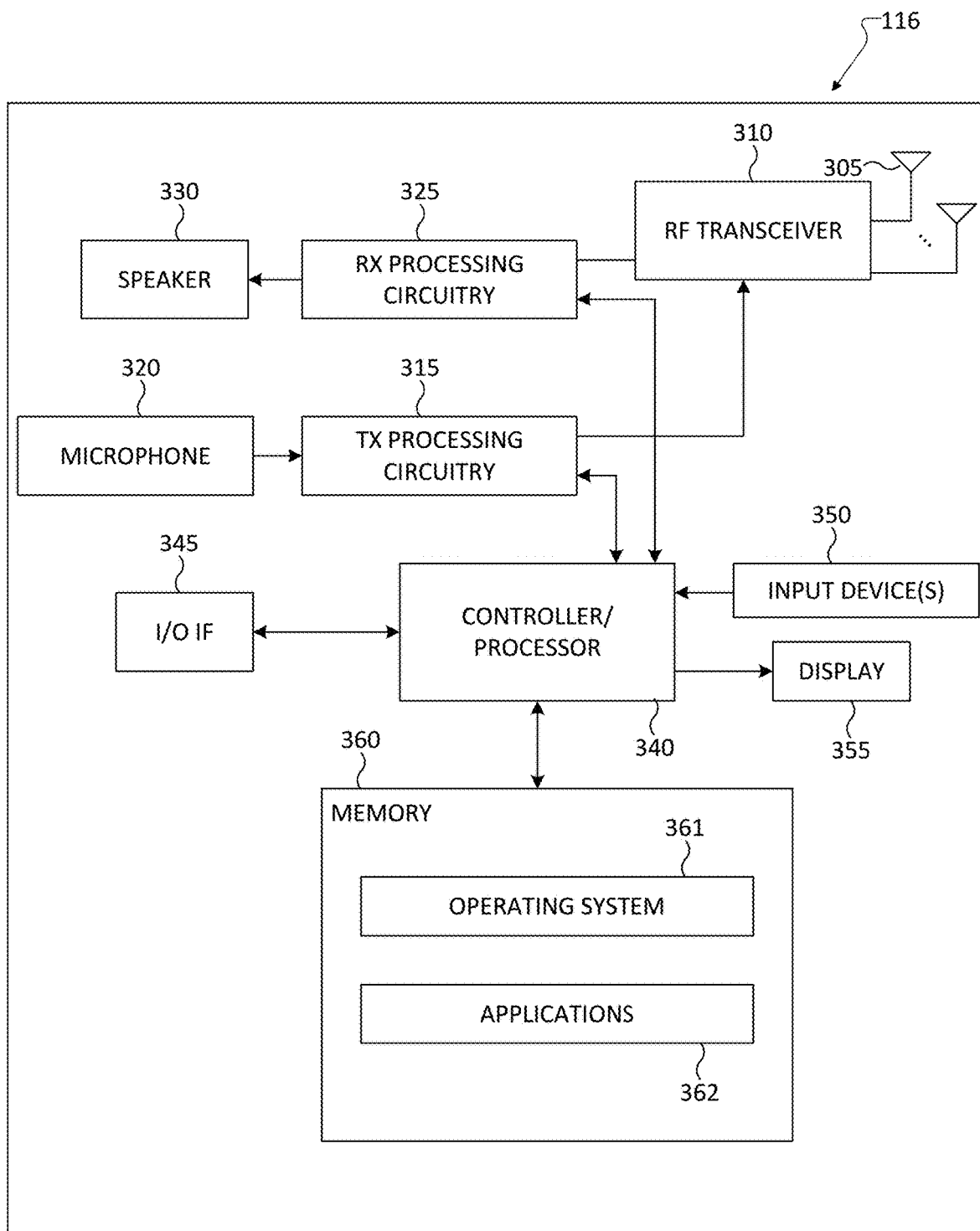
FIG. 3 illustrates an exemplary user equipment (UE) in the networked computing system according to various embodiments of this disclosure.

FIG. 3 illustrates an exemplary user equipment (UE) according to various embodiments of this disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a radio frequency (RF) transceiver 310, transmit (TX) processing circuitry 315, a microphone 320, and receive (RX) processing circuitry 325. The UE 116 also includes a speaker 330, a main processor 340, an input/output (I/O) interface (IF) 345, a keypad 350, a display 355, and a memory 360. The memory 360 includes a basic operating system (OS) program 361 and one or more applications 362.

The RF transceiver 310 receives, from the antenna 305, an incoming RF signal transmitted by an gNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the main processor 340 for further processing (such as for web browsing data).

The TX processing circuitry 315 receives analog or digital voice data from the microphone 320 or other outgoing baseband data (such as web data, e-mail, or interactive video game data) from the main processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The main processor 340 can include one or more processors or other processing devices and execute the basic OS program 361 stored in the memory 360 in order to control the overall operation of the UE 116. For example, the main processor 340 could control the reception of forward channel signals and the transmission of reverse channel signals by the RF transceiver 310, the RX processing circuitry 325, and the TX processing circuitry 315 in accordance with well-known principles. In some embodiments, the main processor 340 includes at least one microprocessor or microcontroller.

The main processor 340 is also capable of executing other processes and programs resident in the memory 360. The main processor 340 can move data into or out of the memory 360 as required by an executing process. In some embodiments, the main processor 340 is configured to execute the applications 362 based on the OS program 361 or in response to signals received from gNBs or an operator. The main processor 340 is also coupled to the I/O interface 345, which provides the UE 116 with the ability to connect to other devices such as laptop computers and handheld computers. The I/O interface 345 is the communication path between these accessories and the main processor 340.

The main processor 340 is also coupled to the keypad 350 and the display unit 355. The operator of the UE 116 can use the keypad 350 to enter data into the UE 116. The display 355 may be a liquid crystal display or other display capable of rendering text and/or at least limited graphics, such as from web sites.

The memory 360 is coupled to the main processor 340. Part of the memory 360 could include a random-access memory (RAM), and another part of the memory 360 could include a Flash memory or other read-only memory (ROM).

As described in more detail below, UE 116 can receive hierarchical codebooks generated by a networked computing device, such as server 134, for use in communicating over networked communication system 100. Additionally, UE 116 can adapt the hierarchical codebook based on usage patterns updated over time. The adapted hierarchical codebook reduces time necessary to perform a beam search procedure on the adapted hierarchical codebook.

Although FIG. 3 illustrates one example of UE 116, various changes may be made to FIG. 3. For example, various components in FIG. 3 could be combined, further subdivided, or omitted and additional components could be added according to particular needs. As a particular example, the main processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

Figure 4:
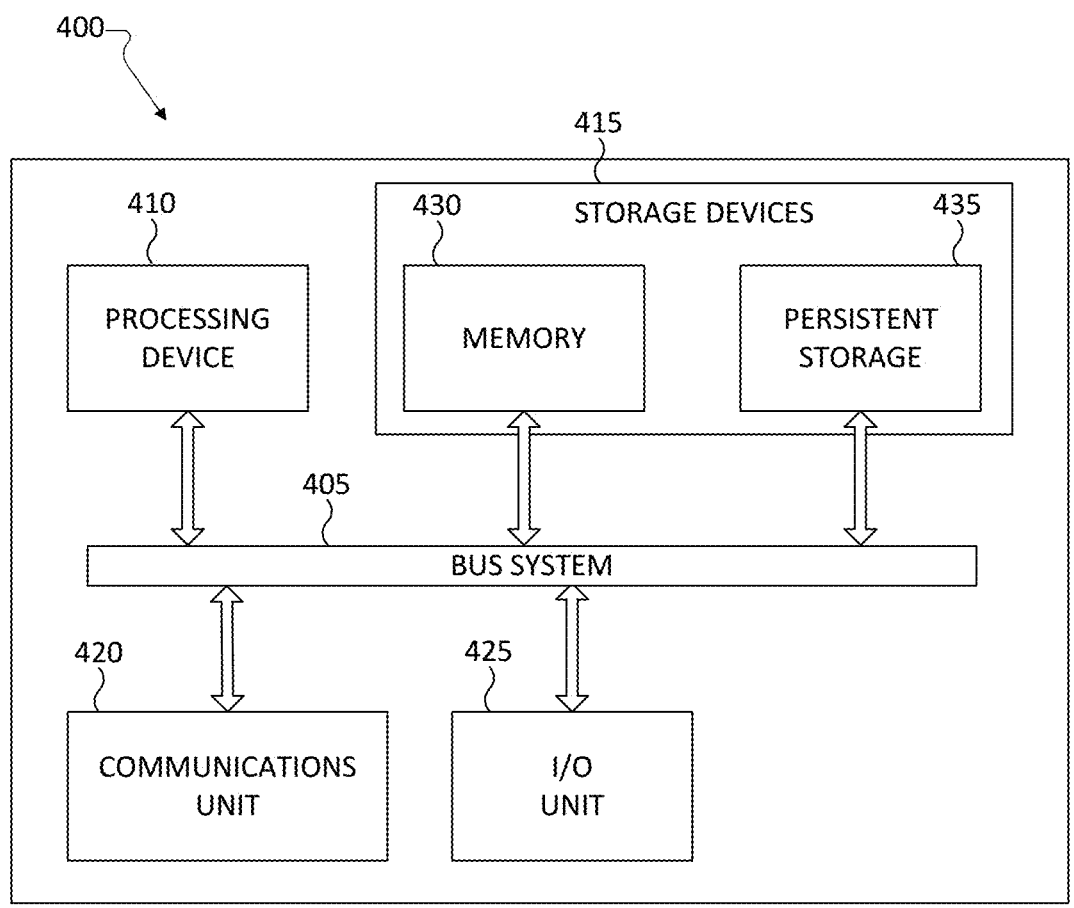
FIG. 4 illustrates an exemplary networked computing device in accordance with various embodiments of this disclosure.

FIG. 4 illustrates an exemplary networked computing device in accordance with various embodiments of this disclosure. In one embodiment, the networked computing device 400 is a server, such as server 134 in FIG. 1.

As shown in FIG. 4, the computing device 400 includes a bus system 405, which supports communication between at least one processing device 410, at least one storage device 415, at least one communications unit 420, and at least one input/output (I/O) unit 425.

The processing device 410 executes instructions that may be loaded into a memory 430. The processing device 410 may include any suitable number(s) and type(s) of processors or other devices in any suitable arrangement. Example types of processing devices 410 include microprocessors, microcontrollers, digital signal processors, field programmable gate arrays, application specific integrated circuits, and discreet circuitry.

The memory 430 and a persistent storage 435 are examples of storage devices 415, which represent any structure(s) capable of storing and facilitating retrieval of information (such as data, program code, and/or other suitable information on a temporary or permanent basis). The memory 430 may represent a random access memory or any other suitable volatile or non-volatile storage device(s). The persistent storage 435 may contain one or more components or devices supporting longer-term storage of data, such as a ready only memory, hard drive, Flash memory, or optical disc.

The communications unit 420 supports communications with other systems or devices. For example, the communications unit 420 could include a network interface card or a wireless transceiver facilitating communications over the network 130. The communications unit 420 may support communications through any suitable physical or wireless communication link(s).

The I/O unit 425 allows for input and output of data. For example, the I/O unit 425 may provide a connection for user input through a keyboard, mouse, keypad, touchscreen, or other suitable input device. The I/O unit 425 may also send output to a display, printer, or other suitable output device.

Note that while FIG. 4 is described as representing the server 134 of FIG. 1, the same or similar structure could be used in one or more client devices. For example, client device 136 can have the same or similar structure as shown in FIG. 4.

As described in more detail below, a computing device such as server 134 in FIG. 4 can be used to design and disseminate hierarchical codebooks for use by an electronic device, such as UE 116 and/or BS 101 for communicating over network 100.

Figure 5:
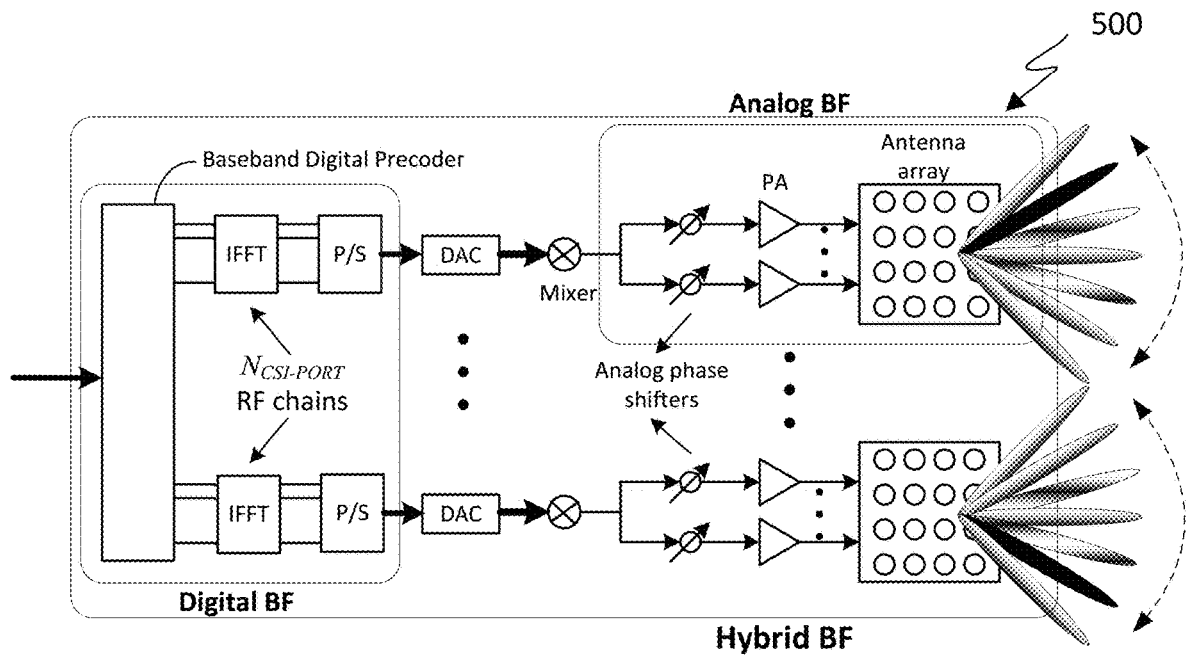
FIG. 5 illustrates a hybrid beamforming architecture in accordance with various embodiments of this disclosure.

FIG. 5 illustrates a hybrid beamforming architecture in accordance with various embodiments of this disclosure. The hybrid beamforming architecture 500 can be implemented in an electronic device, such as BS 102 in FIG. 2 or UE 116 in FIG. 3.

For mmWave bands, the number of antenna elements can be large for a given form factor. However, the number of digitally chain to be limited due to hardware constraints (such as the feasibility to install a large number of ADCs/DACs at mmWave frequencies) as illustrated in FIG. 5. In this case, one digital chain is mapped onto a large number of antenna elements which can be controlled by a bank of analog phase shifters. One digital chain can then correspond to one sub-array which produces a narrow analog beam through analog beamforming. This analog beam can be configured to sweep across a wider range of angles by varying the phase shifter bank across a transmission time interval. The hybrid beamforming architecture as illustrated in FIG. 5 can be applied at the base station and at the UE.

A gNB could utilize one or multiple transmit beams to cover the whole area of one cell. The gNB may form a transmit beam by applying suitable gains and phase settings to an antenna array. The transmit gain, i.e., the amplification of the power of the transmitted signal provided by a transmit beam, is typically inversely proportional to the width or area covered by the beam. At lower carrier frequencies, the more benign propagation losses may make it feasible for gNB to provide coverage with a single transmit beam, i.e., ensure adequate received signal quality at all UE locations within the coverage area via the usage of a single transmit beam. In other words, at lower transmit signal carrier frequencies, the transmit power amplification provided by the transmit beam with a width large enough to cover the area may be sufficient to overcome the propagation losses to ensure adequate received signal quality at all UE locations within the coverage area. However, at higher signal carrier frequencies, the transmit beam power amplification corresponding to the same coverage area may not be sufficient to overcome the higher propagation losses, resulting in a degradation of received signal quality at UE locations within the coverage area. In order to overcome such a received signal quality degradation, the gNB may form a number of transmit beams, each providing coverage over a region narrower than the overall coverage region, but providing the transmit power amplification sufficient to overcome the higher signal propagation loss due to the usage of higher transmit signal carrier frequencies. The UE may also form receive beams to increase the signal-to-interference-and-noise ratio (SINR) at the receiver. Likewise, in the uplink, the UE may form transmit beams and the gNB may form receive beams.

To assist the UE in determining its RX and/or TX beam, a beam sweeping procedure is employed consisting of the gNB transmitting a set of transmit beams to sweep the cell area and the UE measuring the signal quality on different beams using its receive beams. To facilitate candidate beam identification, beam measurement and beam quality reporting, the gNB configures the UE with one or more RS resource (e.g. SS Block, Periodic/Aperiodic/Semi-Persistent CSI-RS resources or CRIs) corresponding to a set of TX beams. An RS resource refers to a reference signal transmission on a combination of one or more time (OFDM symbol)/frequency (resource element)/spatial (antenna port) domain locations. For each RX beam, the UE reports different TX beams received using that RX beam, ranked in order of signal strength (RSRP) and optionally CSI (CQI/PMI/RI)). Based on the UE's measurement report feedback, the gNB configures the UE with a set of TX-RX beam pairs for reception of PDCCH and/or PDSCH.

As used herein, the terms "beam", "beam codeword" and "beamforming weights" are used interchangeably. Further, bold uppercase letters, e.g., A, and bold lowercase letters, e.g., a, represent a matrix and a column vector, respectively. $(\cdot)^c$, $(\cdot)^T$, $(\cdot)^H$ denote the conjugate, transpose and Hermitian operators, respectively. $[A]_{i,:}$ and $[A]_{:,j}$ stands for the i-th row and j-th column of the matrix A, respectively.

Universal Beam Design Method

Denote the response matrix at the i-th direction as $M_i$, and the response matrix at the direction $(\theta,\phi)$ as $M(\theta,\phi)$. For the simulated or measured E-field data, the method to generate the matrix is given in REF 1. For the E-field data generated through steering vectors, the M matrix for a given direction can be defined as:

$$M(\theta,\phi)=e(\theta,\phi)^c e(\theta,\phi)^T,$$

where $a^c$, $a^T$ stands for the conjugate and the transpose of a vector a, respectively.

The E-field response data $e(\theta,\phi)$ at the direction $(\theta, \phi)$ of an array with antenna element pattern of $f_0(\theta,\phi)$ is:

$$e(\theta, \phi)^T \triangleq [e_1(\theta, \phi), e_2(\theta, \phi), \ldots e_L(\theta, \phi)]$$
$$= cf_0(\theta, \phi)\exp\left(j\frac{2\pi}{\lambda}[\sin\theta\cos\phi, \sin\theta\sin\phi, \cos\theta]\begin{bmatrix} x_1 & \cdots & x_L \\ y_1 & \ddots & y_L \\ z_1 & \cdots & z_L \end{bmatrix}\right),$$

where L is the number of antenna elements, $(x_i, y_i, z_i)$ are the coordinates of the i-th antenna element, $\lambda$ is the wavelength, and c is a constant taking into account the radiation efficiency.

The beamforming gain of beam w at the i-th direction is $w^H M_i w$. The set of interested directions is given by I. The objective function is assumed to be in the form as below:

$$F(w) = \sum_{i \in I} f_i(w^H M_i w)$$

where $f_i(x)$ denotes a utility function at the i-th direction. There are several notes about $f_i(x)$ as below.

First, the function $f_i(x)$ is designed according to the requirements. As shown later, $f_i(x)$ can be non-decreasing concave functions if the goal is to design a wide beam. If the objective is to maximize the average data rate, $f_i(x)$ can be designed as $\log_2(1+\gamma x)$ where $\gamma$ represents the channel gain.

Second, $f_i(x)$ can be different for each $i \in I$. For example, if the different directions have different priorities, then $f_i(x)$ can be designed as $a_i x$ where larger $a_i$ means high priority for i-th direction.

Third, $f(x)$ can be differentiable or non-differentiable. For a non-differentiable concave function $f(x)$, $f'(x)$ stands for the subgradient of $f(x)$, namely, $f(x) \leq f(x_0) + f'(x_0)(x-x_0)$ if $f(x)$ is concave, and $f(x) \geq f(x_0) + f'(x_0)(x-x_0)$ if $f(x)$ is convex.

Fourth, scaling the utility functions $f_i(x)$ with a same positive factor does not change the wide beam solution since $$\underset{w \in \mathbb{W}}{\operatorname{argmax}} \sum_{i \in I} f_i(w^H M_i w) = \underset{w \in \mathbb{W}}{\operatorname{argmax}} \sum_{i \in I} c f_i(w^H M_i w),$$

for any $c > 0$, and $\mathbb{W}$ stands for the set of possible beam codewords.

Next, a method is shown to calculate the beam to maximize the objective function $\Sigma_{i \in I} f_i(w^H M_i w)$ under several different constraints on the beam, including the total power constraint, per-element power constraint, and phase shifter resolution constraint.

Beam Design with Total Power Constraint

If the power constraint is on the total power P, the optimization problem is then, $$\max \sum_{i \in I} f_i(w^H M_i w)$$
$$\text{s.t.: } w^H w = P$$

The Lagrangian of the optimization problem is, $$\mathcal{L}_1(w, \lambda) = \sum_{i \in I} f_i(w^H M_i W) + \lambda(P - w^H w)$$

By the KKT condition, the optimal w should satisfy, $$\frac{d\mathcal{L}_1(w, \lambda)}{dw^H} = \sum_{i \in I} \frac{df_i(w^H M_i w)}{dw^H} - \lambda w$$
$$= \sum_{i \in I} f_i'(w^H M_i w) M_i w - \lambda w$$
$$= 0$$

Then a stationary solution of w should satisfy the equation:

$$w = \sqrt{P} \frac{\sum_{i \in I} f_i'(w^H M_i w) M_i w}{\|\sum_{i \in I} f_i'(w^H M_i w) M_i w\|}.$$

An iterative method to compute $w^{(n+1)}$ from $w^{(n)}$ is then $$w^{(n+1)} = \sqrt{P} \frac{\sum_{i \in I} f_i'((w^{(n)})^H M_i w^{(n)}) M_i w^{(n)}}{\|\sum_{i \in I} f_i'((w^{(n)})^H M_i w^{(n)}) M_i w^{(n)}\|} \quad (1)$$

Continuous-Phase Unimodular Beam Design $$|w_\ell|^2 = \frac{P}{L}, \forall\, 1 \leq \ell \leq L$$

In a second case, the power constraint is on each antenna element, i.e., where L is the length of w. In other words, w has to be a unimodular beam codeword.

The optimization problem in this case is, $$\max \sum_{i \in I} f_i(w^H M_i w) \text{ s.t.: } w_\ell^* w_\ell = \frac{P}{L}, \forall\, \ell$$

The Lagrangian of this optimization problem is, $$\mathcal{L}_2(w, \lambda) = \sum_{i \in I} f_i(w^H M_i w) + \sum_\ell \lambda_\ell \left(\frac{P}{L} - w_\ell^* w_\ell\right)$$

By the KKT condition, the optimal w should satisfy, $$\frac{d\mathcal{L}_2(w, \lambda)}{dw_\ell^H} = \sum_{i \in I} \frac{df_i(w^H M_i w)}{dw_\ell^H} - \lambda w_\ell = \sum_{i \in I} f_i'(w^H M_i w)[M_i]_{\ell,:} w - \lambda_\ell w_\ell = 0$$

Therefore, the optimal w satisfies, $$w_\ell = \sqrt{\frac{P}{L}} \frac{\sum_{i \in I} f_i'(w^H M_i w)[M_i]_{\ell,:} w}{\|\sum_{i \in I} f_i'(w^H M_i w)[M_i]_{\ell,:} w\|}, \forall\, \ell$$

An iterative method to compute $w^{(n+1)}$ from $w^{(n)}$ is then, $$w_\ell^{(n+1)} = \sqrt{\frac{P}{L}} \frac{\sum_{i \in I} f_i'((w^{(n)})^H M_i w^{(n)})[M_i]_{\ell,:} w^{(n)}}{\|\sum_{i \in I} f_i'((w^{(n)})^H M_i w^{(n)})[M_i]_{\ell,:} w^{(n)}\|}, \quad (2)$$

Discrete Phase Unimodular Beam Design

In another case, in additional to the per-antenna power constraint, the phase shifters have limited resolution, for example, b-bit. Then the optimization problem is as follows.

$$\max \sum_{i \in I} f_i(w^H M_i w)$$
$$\text{s.t.: } w_\ell^* w_\ell = \frac{P}{L}, \forall\, \ell$$
$$\arg(w_\ell) \in \left\{0, \frac{2\pi}{2^b}, \frac{4\pi}{2^b}, \frac{2(2^b-1)\pi}{2^b}\right\}$$

Then an iterative way to compute $w^{(n+1)}$ from $w^{(n)}$ is then, $$w_\ell^{(n+1)} = \sqrt{\frac{P}{L}} \exp\left\{jQ_b\left(\arg\left(\frac{\sum_{i \in I} f_i'((w^{(n)})^H M_i w^{(n)})[M_i]_{\ell,:} w^{(n)}}{\|\sum_{i \in I} f_i'((w^{(n)})^H M_i w^{(n)})[M_i]_{\ell,:} w^{(n)}\|}\right)\right)\right\}, \quad (3)$$

where $Q_b(x)$ is a function quantize the angle from $[0, 2\pi)$ to $$\left\{0, \frac{2\pi}{2^b}, \frac{4\pi}{2^b}, \frac{2(2^b-1)\pi}{2^b}\right\}.$$

The algorithm is summarized as follows:

Step 1: Determine a non-decreasing concave function according to the requirements on the gain.

Step 2: Initialize w. The phase of w could be random number between 0 and $2\pi$.

Step 3: $w^{(n+1)}$ can be computed from $w^{(n)}$ by following Equation (1) or (2) or (3), according to the constraint on the per-antenna power and phase shifter resolution. In Eq. (1), all the elements are update simultaneously in each iteration. In Eq. (2) and (3), only one entry of the beam is updated. This entry index $\ell^{(n)}$ can be selected randomly from the set $\{1, 2, \ldots L\}$ or sequentially, i.e., $\ell^{(n+1)} = \text{mod}(\ell^{(n)}+1, L)$. Note that other ways to calculate $w^{(n+1)}$, (for example, projected gradient algorithm, semi-definite relaxation) are not excluded.

Step 4: Check the convergence of the algorithm. For example, check if $\|w^{(n+1)} - w^{(n)}\| \leq \varepsilon$. If the algorithm converges, then stop and output $w^{(n+1)}$ as the required beam. Otherwise, return to Step 3.

An exemplary flow chart of the beam design method for a single initialization is depicted in the figure that follows.

Figure 6:
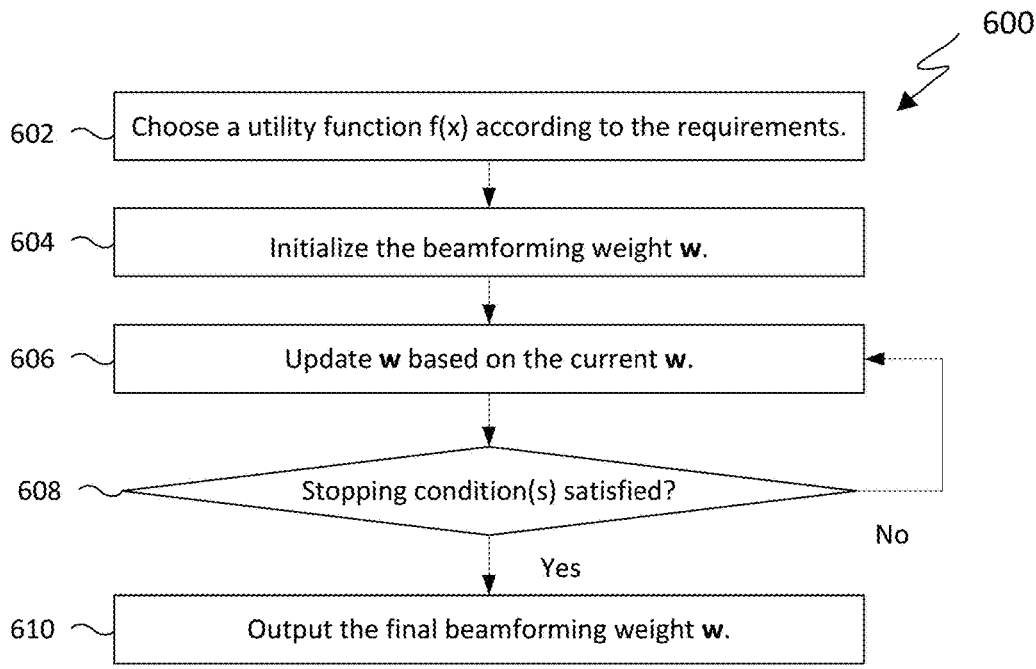
FIG. 6 illustrates a flowchart for designing a beam codeword with single initialization in accordance with various embodiments of this disclosure.

FIG. 6 illustrates a flowchart for designing a beam codeword with single initialization in accordance with various embodiments of this disclosure. Operations of flowchart 600 can be implemented in a computing device such as computing device 400 in FIG. 4.

Flowchart 600 begins at operation 602 by choosing a utility function f(x) according to the requirements. In operation 604, the beamforming weight w is initialized. The beamforming weight is updated based on the current beamforming weight in operation 606. Thereafter, in operation 608 a determination is made as to whether a stopping condition has been satisfied. If a stopping condition has not been satisfied, then flowchart 600 returns to operation 606. However, if a stopping condition has been satisfied, then flowchart 600 proceeds from operation 608 to operation 610 where the final beamforming weight is w outputted.

Multiple different initial points can be adopted in operation 604. The algorithm runs multiple times with different initial points and the best resultant beam codewords can be selected. By doing so, there is a higher chance to obtain a beam with good performance. An example flow chart of the beam design method is given in the figure that follows.

Figure 7:
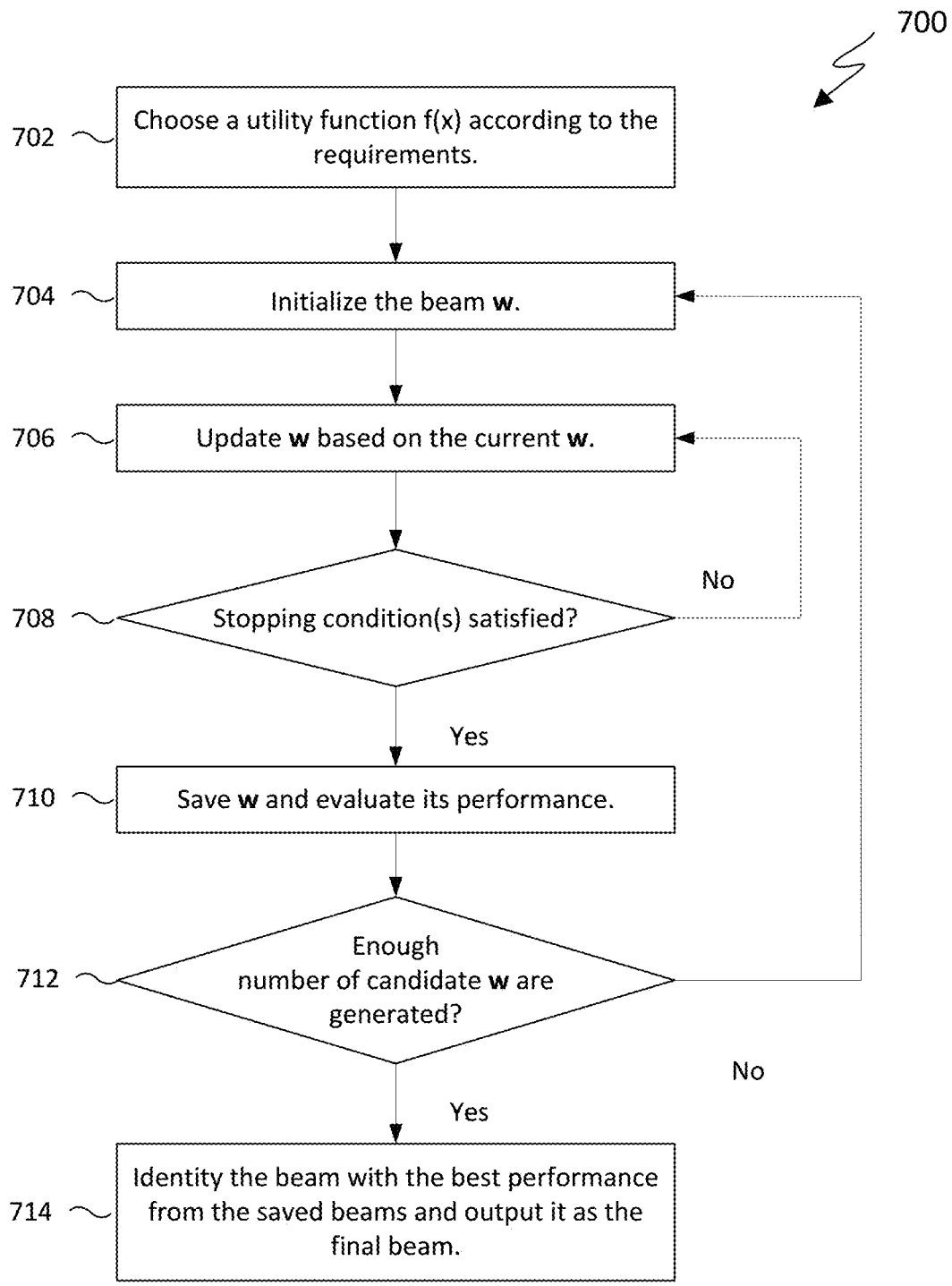
FIG. 7 illustrates a flowchart for designing a beam codeword with multiple different initializations in accordance with various embodiments of this disclosure.

FIG. 7 illustrates a flowchart for designing a beam codeword with multiple different initializations in accordance with various embodiments of this disclosure. Operations of flowchart 700 can be implemented in a computing device, such as computing device 400 in FIG. 4.

Flowchart 700 begins at operation 702 by choosing a utility function f(x) according to the requirements. In operation 704, the beamforming weight w is initialized. The beamforming weight is updated based on the current beamforming weight in operation 706. Thereafter, in operation 708 a determination is made as to whether a stopping condition has been satisfied. If a stopping condition has not been satisfied, then flowchart 700 returns to operation 706. However, if a stopping condition has been satisfied, then flowchart 700 proceeds from operation 708 to operation 710 where w is saved and its performance is evaluated. In operation 712, a determination is made as to whether a sufficient number of candidates w are generated. If a sufficient number of candidates w have not been generated, then flowchart 700 returns to operation 704. However, if a sufficient number of candidate w have been generated, then flowchart 700 proceeds from operation 712 to operation 714 where the beam with the best performance is identified from the saved beams, and the identified beam is output as the final beam.

Figure 8:
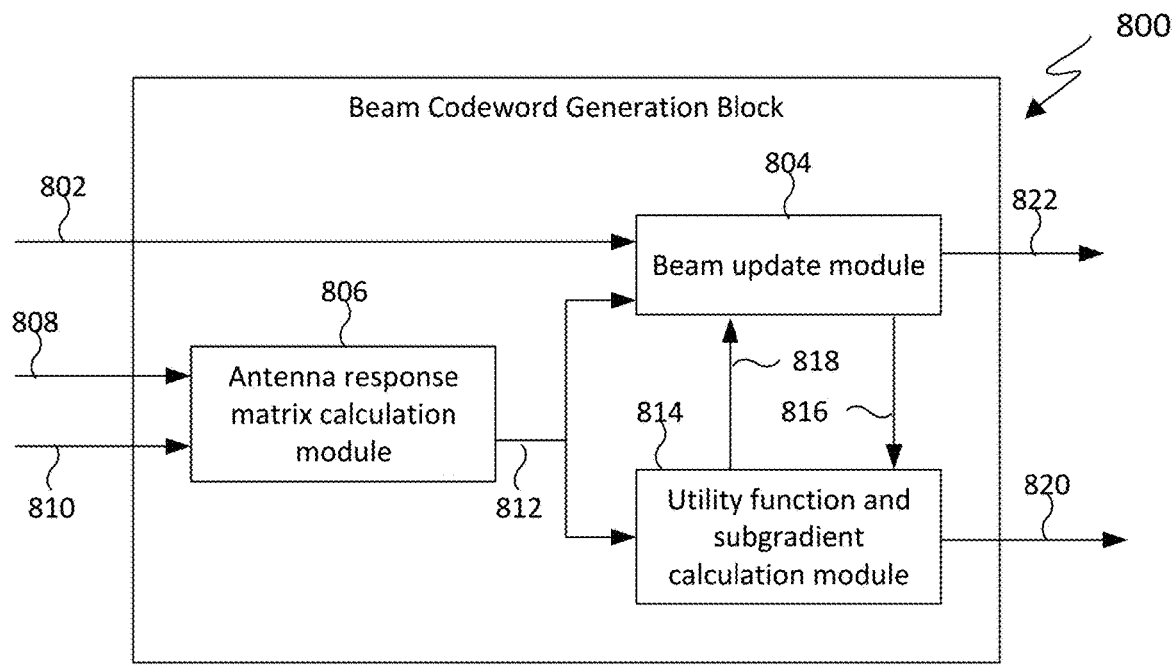
FIG. 8 illustrates an exemplary functional block diagram for beam generation according to various embodiments of this disclosure.

FIG. 8 illustrates an exemplary functional block diagram for beam generation according to various embodiments of this disclosure. Block diagram 800 can be implemented in a computing device such as computing device 400 in FIG. 4.

Beam gain utility function description and selection 802 can include the priority of the directions, the set of signal directions, the set of interference directions, etc. The beam gain utility function description and selection 802 is an input to the beam update module 804. In one embodiment, the beam update module 804 is configured to set an initial beam and calculate an updated beam iteratively. The antenna response matrix calculation module 806 takes the antenna elements' EM data 808 and the coverage requirements 810 (i.e., set of interested directions ($\theta,\phi$), denoted as I) as inputs and produces the antenna response matrices 812 (one matrix for each direction, $M_i$, $i \in I$). The utility function and subgradient calculation module 814 takes the antenna response matrices 812 ($M_i$, $i \in I$) and the utility function description or selection 802, and the initial beam 816 (or an updated beam in an iterative procedure as shown in FIG. 5) as inputs, and produces the utility function subgradient result 818. It can also produce the final utility function result 820 for the final beam 822 produced by the beam update module 804. The final beam 822 is generated according to the utility function and antenna elements' EM data. The beam update module 804 takes the antenna response matrices 812 and the utility function subgradient result 818 and produces the updated beam 816. Once the iterative process between the beam update module 804 and the utility function and subgradient calculation module 814 converges, the beam update module 804 outputs the generated beam 822.

Note that not every design requirement can be formulated as a sum of utility functions. The utility function is thus designed to approximate the design requirements in these cases. If the generated beam does not meet the design requirements, the form and parameters of the utility function can be adjusted to generate a beam more likely to meet the requirements. The adjustment of utility function can be decided according to the design requirements and the performance of the obtained beams from previous chosen utility functions. There is no limitation on the way of performing the adjustment. An example flow chart of the beam design method is provided in FIG. 9 that follows.

Figure 9:
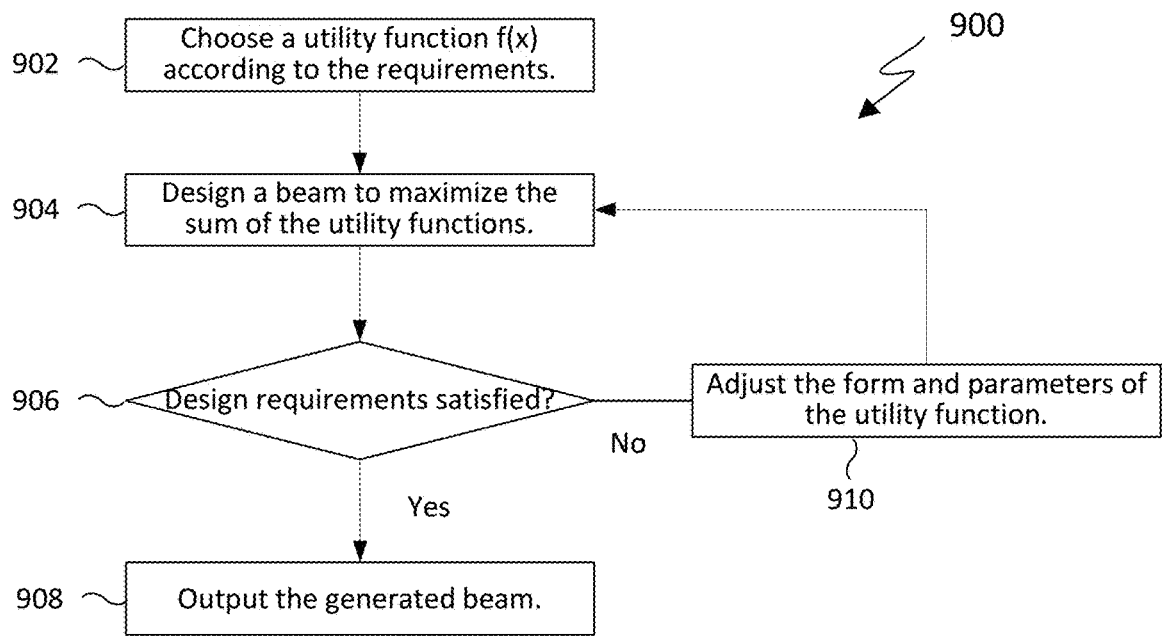
FIG. 9 illustrates a flowchart for adjusting a utility function to design a beam to meet or approach design requirements according to various embodiments of this disclosure.

FIG. 9 illustrates a flowchart for adjusting a utility function to design a beam to meet or approach design requirements according to various embodiments of this disclosure. Operations of flowchart 900 can be implemented in a computing device such as computing device 400 in FIG. 4.

Flowchart 900 begins at operation 902 by choosing a utility function f(x) according to the design requirements. In operation 904 a beam is designed to maximize the sum of the utility functions. In operation 906, a determination is made as to whether the design requirements have been satisfied. If the design requirements have been satisfied, then flowchart 900 proceeds to operation 908 where the generated beam is outputted. However, if the design requirements have not been satisfied in operation 906, then flowchart 900 proceeds to operation 910 where the form and parameters of the utility function are adjusted before returning to operation 904.

Figure 10:
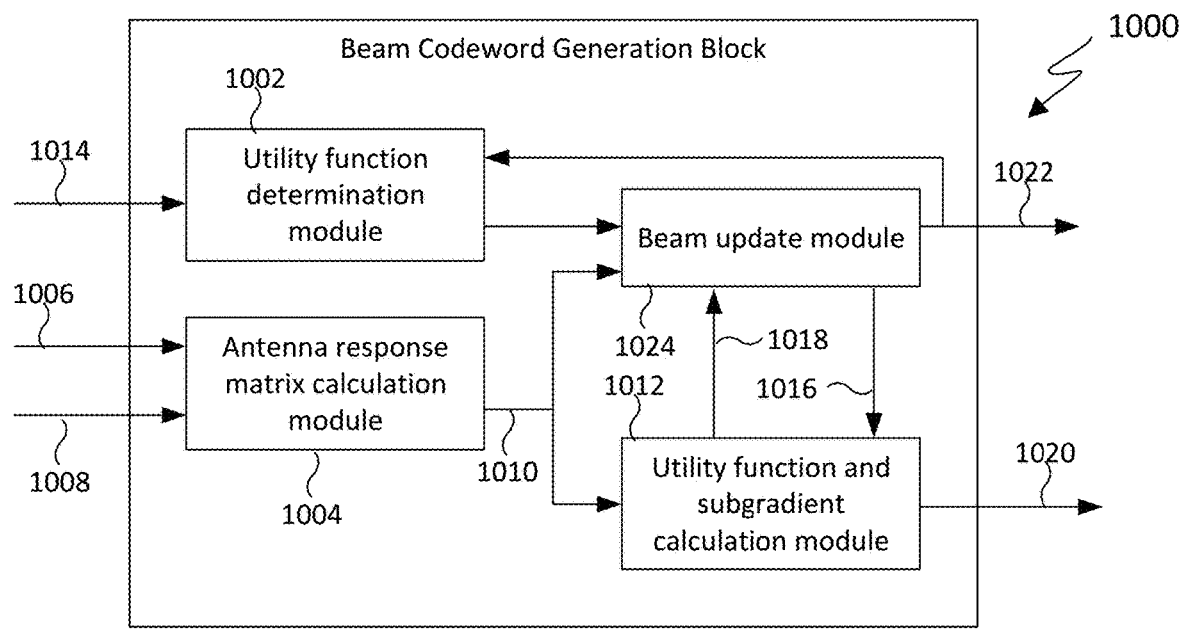
FIG. 10 illustrates an exemplary functional block diagram for beam generation according to various embodiments of this disclosure.

FIG. 10 illustrates an exemplary functional block diagram 1000 for beam generation according to various embodiments of this disclosure. The functional block diagram can be implemented in a computing device, such as computing device 400 in FIG. 4, and used for the beam generation method described in FIG. 8.

The utility function determination module 1002 determines the form and parameters in the utility function. It also updates the form and parameters of the utility function if the generated beam does not meet the design requirements. The antenna response matrix calculation module 1004 takes the antenna elements' EM data 1006 and the coverage requirements 1008 (i.e., set of interested directions (θ,ϕ), denoted as I) as inputs and produces the antenna response matrices 1010 (one matrix for each direction, $M_i$, i∈I). The utility function and subgradient calculation module 1012 takes the antenna response matrices 1010 (i.e., $M_i$, i∈I) and the utility function description or selection 1014, and the initial beam 1016 (or the updated beam in an iterative procedure as shown in FIG. 6) as inputs, and produces the utility function subgradient result 1018. It can also produce the final utility function result 1020 for the final beam 1022 produced by the beam update module 1024. The beam update module 1024 takes the antenna response matrices 1010 and the utility function subgradient result 1018 and produces the updated beam 1016. Once the iterative process between the beam update module 1024 and the utility function and subgradient calculation module 1012 converges, the beam update module 1024 outputs the generated beam 1022 to utility function determination module 1002, which will check whether the generated beam meets the design requirements. If the generated beam 1022 meets the design requirements, then the generated beam 1022 will be the final beam. Otherwise, the utility function determination module 1002 will update the form and parameters of the utility function.

Wide Beam Design

One application of the generic beam design method is to generate a wide beam, where the gain within the coverage region is large (or large enough), and the fluctuation of the gain within the coverage region is small. If the mean gain is directly maximize across the coverage region, i.e., $$\frac{1}{|I|}\sum_{i\in I} w^H M_i w,$$

the generated beam may be a narrow beam, which only provides very high gain in some directions, but low gain in the other directions. The objective function is therefore designed to take into account the "fairness" constraint, namely, maintaining a balance between two competing interests: trying to maximize average gain while at the same time avoiding coverage holes/sinks or large fluctuations of the gains in the required coverage angular region.

To take into account the fairness constraint, $f_i(x)$ has to be a non-decreasing concave function defined over $0 \le x \le C$ where C is an upper bound of beamforming gain (or a sufficient large number which is larger than the maximum possible beamforming gain).

In one embodiment, $f_i(x)$ is independent of i in the wide beam design algorithm. The possible choices of the utility function $f(x)$ include but not limited to any one of the following functions.

$f(x) = a\log(x)$ where $a > 0$.

A special case is $f(x) = \ln x$.

$f(x) = a_1\log(1 + a_2 x)$ where $a_1 > 0, a_2 > 0$.

$f(x) = a_1 x^k + a_2$, where $a_1 > 0, 0 < k < 1$.

A special case is $f(x) = \sqrt{x}$.

$f(x) = -a_1 x^{-k} + a_2$, where $a_1 > 0, k > 0$.

$f(x) = 1 - a\exp(-cx)$ where $a > 0, c > 0$.

$f(x) = \exp\left(-\frac{a}{b+cx}\right) a > 0, b > 0, c > 0$.

$f(x) = \sin\frac{\pi x}{2C}$ where $C$ is no less than the largest possible gain.

$f(x)$ is a piecewise linear function with non-negative and decreasing slopes, as defined below:

$$f(x) = \begin{cases} a_1 x + b_1, & 0 \le x \le x_1; \\ a_2(x - x_1) + a_1 x_1 + b_1, & x_1 \le x \le x_2; \\ a_3(x - x_2) + a_2(x_2 - x_1) + a_1 x_1 + b_1, & x_2 \le x \le x_3; \\ \ldots \end{cases}$$

where $a_1 > a_2 > a_3 > \ldots \ge 0$ and the values of $x_1, x_2, x_3, \ldots$ can be determined based on the required beamforming gains. A particular case is:

$$f(x) = \begin{cases} x, & 0 \le x \le x_1; \\ a(x - x_1) + x_1, & x \ge x_1 \end{cases}.$$

where $x_1$ is the minimum gain to maintain the link, and $0 \le a < 1$ represents the slope of the utility function when the gain is larger than the minimum gain.

In one embodiment, $f_i(x)$ can be dependent on i. For example, $$f_i(x) = \frac{x}{\lambda(M_i)P}$$

where $\lambda(M_i)$ is the maximal eigenvalue of the E-field response matrix $M_i$, and P is the maximal beamforming power. The upper bound of the beamforming gain at the i-th direction is $\lambda(M_i)P$. By normalized the gain with the upper bound, the average relative beamforming gain with respect to the upper bound, rather than the average absolute beamforming gain is maximized.

Examples of the concave utility functions can include:

$$\ln x,$$
$$\log_2(1+x),$$
$$\sqrt{x}, -\frac{1}{x},$$
$$1 - \exp(-x),$$
$$\exp\left(-\frac{1}{1+x}\right),$$
$$\sin\left(\frac{\pi x}{10}\right), \text{ and}$$
$$\min\left(x, \frac{x+2}{3}, 2\right).$$

Each of $\ln x$, $\log_2(1+x)$, $$\sqrt{x}, -\frac{1}{x}, 1-\exp(-x), \exp\left(-\frac{1}{1+x}\right), \text{ and } \sin\left(\frac{\pi x}{10}\right)$$

are differentiable functions in the region [0, 5] while min $$\left(x, \frac{x+2}{3}, 2\right)$$

is not differentiable. To determine the best function and the associated parameters, the trial-and-error method can be applied. In general, if less gain fluctuation is desired, then the slopes of the function should decrease more quickly. For example, the utility function $x^{1/3}$ is more likely to result in a flatter beam than $x^{1/2}$, but may cause large sidelobes outside the desired coverage region.

Beam Design for Other Target Properties

Although the utility function examples described before are mainly designed for wide beams, the procedure can be used to generate a beam with other target properties.

Prioritized Directions

In one embodiment, to prioritize certain directions over others, the utility function can be $f_i(x) = a_i x$. Then the proposed method can generate a beam which maximizes the weighted sum of gains over the region, as follows:

$$\sum_{i \in I} f_i(w_i^H M_i w_i) = \sum_i a_i w_i^H M_i w_i$$

Side Beam Suppression

In one embodiment, the method can design beam to suppress the leakage outside the coverage region and boost the gain within the coverage region simultaneously. This can be done by revising the utility function as follows:

$$\max \sum_{i \in I} f_i(w^H M_i w) = \max\left[\sum_{i \in I_1} f(w^H M_i w) - \sum_{i \in I \setminus I_1} g(w^H M_i w)\right]$$

where $I_1$ is the set of required coverage region, $f(\cdot)$ is the function representing the reward for the beamforming gain inside the coverage region, and $g(\cdot)$ is a function representing the penalty for the out-of-region gains. $f(x)$ is a non-decreasing function as more reward should be applied to large mainlobe gain. $g(x)$ is a non-decreasing function as more penalty should be applied to large sidelobe emission. Moreover, $f(\cdot)$ and $g(\cdot)$ can be either concave or convex functions, depending on the design requirement. The iterative update procedure is similar as that described before with minor revisions. For example, Eq. (1) is changed to the following equation:

$$w^{(n+1)} = \sqrt{P} \frac{\sum_{i \in I_1} f'\left((w^{(n)})^H M_i w^{(n)}\right) M_i w^{(n)} - \sum_{i \in I \setminus I_1} g'\left((w^{(n)})^H M_i w^{(n)}\right) M_i w^{(n)}}{\left\|\sum_{i \in I_1} f'((w^{(n)})^H M_i w^{(n)}) M_i w^{(n)} - \sum_{i \in I \setminus I_1} g'((w^{(n)})^H M_i w^{(n)}) M_i w^{(n)}\right\|}$$

Maximization of Signal to Interference Ratio (SIR)

In one embodiment, the method can design a beam to receive/transmit desired signal while suppressing the interference. Denote the set of signal directions as $I_1$, while the set of interference directions as $I_2$. The design objective can be described as follows:

$$\max \sum_{i \in I} f_i(w^H M_i w) = \max\left[\sum_{i \in I_1} f(w^H M_i w) - \sum_{i \in I_2} g(w^H M_i w)\right]$$

where $f(\cdot)$ is the function representing the reward for signal power, and $g(\cdot)$ is a function representing the penalty for the interference power. $g(x)$ is a non-decreasing function as more penalty should be applied to large interference. $f(\cdot)$ and $g(\cdot)$ can be either concave or convex functions, depending on the design requirement. The iterative update procedure is similar as that described before with minor revisions. For example, Eq. (1) is changed to the equation that follows:

$$w^{(n+1)} = \sqrt{P} \frac{\sum_{i \in I_1} f'\left((w^{(n)})^H M_i w^{(n)}\right) M_i w^{(n)} - \sum_{i \in I_2} g'\left((w^{(n)})^H M_i w^{(n)}\right) M_i w^{(n)}}{\left\|\sum_{i \in I_1} f'((w^{(n)})^H M_i w^{(n)}) M_i w^{(n)} - \sum_{i \in I_2} g'((w^{(n)})^H M_i w^{(n)}) M_i w^{(n)}\right\|}$$

In a particular case, there is only one signal direction and one interference direction, namely, $|I_1|=|I_2|=1$. By choosing $f(x)=g(x)=\log x$, the objective function degenerates to the SIR as shown below:

$$f(w^H M_i w) - g(w^H M_j w) = \log \frac{w^H M_i w}{w^H M_j w}$$

where $W_i$ and $W_j$ are the response matrices of the signal and interference direction, respectively.

Maximization of the Average Data Rate

In one embodiment, the method can design a beam to maximize the average data rate. The design objective can be described as follows:

$$\max \sum_{i \in I} f_i(w^H M_i w) = \max \sum_i R_i(w^H M_i w)$$

where $R_i(\cdot)$ stands for the data rate.

For Shannon capacity (which is the upper bound of the achievable rate), $R_i = \log_2(1 + \gamma w^H M_i w)$ where $\gamma$ stands for the end-to-end SNR between the transmitter and receiver except the beamforming gain. Moreover, $R_i$ can also be other expressions of achievable rate by practical modulation and coding schemes.

Maximization of the Beam Detection Probability

In one embodiment, the method can design a beam to maximize the average detection probability. The design objective can be described by the following:

$$\max \sum_{i \in I} f_i(w^H M_i w) = \max \sum_i p(w^H M_i w)$$

where $p(x)$ ($0 \le p(x) \le 1$) is the detection probability as a function of the beamforming gain. For a Rayleigh fading channel, the detection probability is exp $$\left(-\frac{\Gamma}{1+\gamma x}\right),$$

where $\gamma$ stands for the end-to-end SNR between the transmitter and receiver except the beamforming gain, $\Gamma N_0$ is the detection threshold and $N_0$ is the additive white Gaussian noise variance as described in REF 3.

Beam Codebook Design

A method of designing a codebook consisting of K(K≥2) beams is provided. Given an initial set of K beams $w_1$, $w_2$, $w_K$ and a set of $N_p$ directions of interest $\mathcal{D} = \{(\theta_1, \phi_1), (\theta_2, \phi_2), \ldots, (\theta_{N_p}, \phi_{N_p})\}$, the algorithm proceeds by alternating between the following two steps:

Assignment Step:

Assign each direction to the beam, which provides the largest gain. Mathematically, this means partitioning the set of directions D to K subsets, denoted as $\mathcal{D}_1, \mathcal{D}_2, \ldots, \mathcal{D}_K$. The set of directions $\mathcal{D}_k$ is served by the beam $w_k$ and is defined as follows:

$$\mathcal{D}_k = \left\{(\theta, \phi) \mid k = \operatorname*{argmax}_{1 \le i \le K} f_{(\theta, \phi)}(w_i^H M(\theta, \phi) w_i)\right\}$$

Update Step:

Optimize the beams to serve the directions in their associated subsets. This is done by solving the following equation for $1 \le k \le K$:

$$w_k = \operatorname*{argmax}_w \sum_{(\theta, \varphi) \in \mathcal{D}_k} f_{(\theta, \phi)}(w^H M(\theta, \varphi) w)$$

The choices of the utility function $f(x)$ can be determined based on the design requirements of the beam codewords described in the previous section. $w_k$ can be found by the iterative algorithm described before. The algorithm can be terminated when the assignments of beams to $\mathcal{D}_k$ no longer change.

Figure 11:
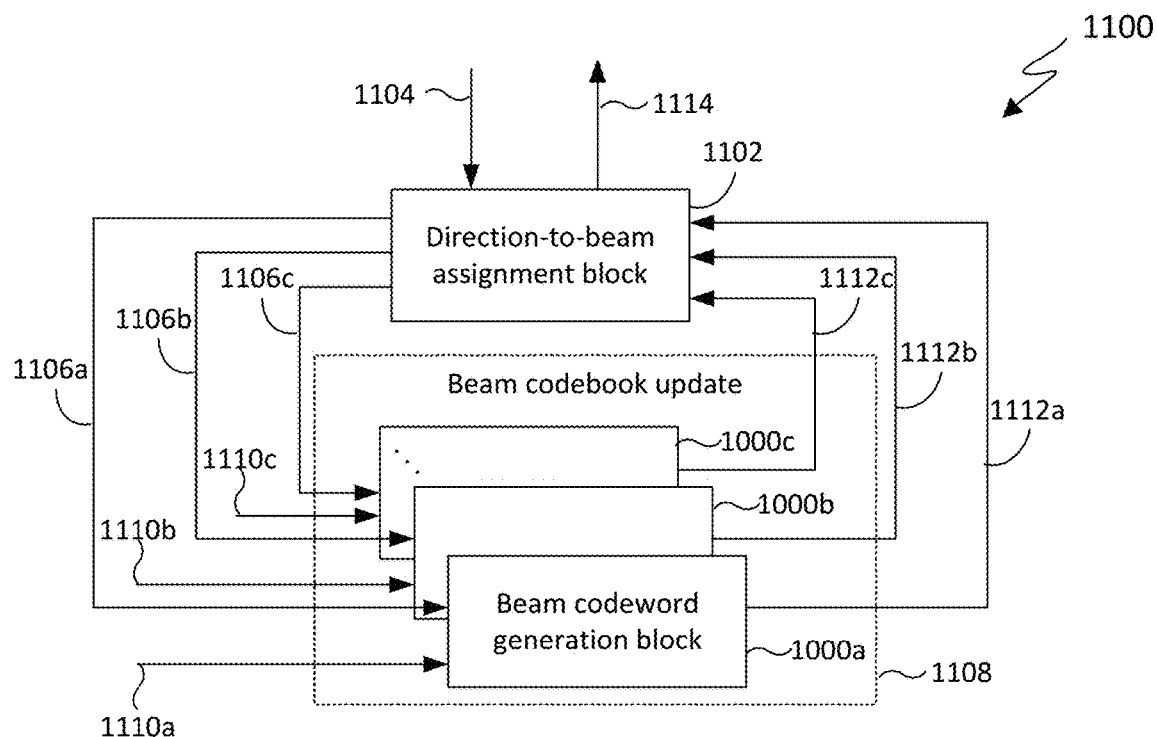
FIG. 11 illustrates an exemplary functional block diagram for beam codebook generation according to various embodiments of this disclosure.

FIG. 11 illustrates another exemplary functional block diagram for beam codebook generation according to various embodiments of this disclosure. The functional block diagram 1100 can be implemented in a computing device, such as computing device 400 in FIG. 4.

Functional block diagram 1100 includes a direction-to-beam assignment block 1102, which takes the coverage requirement 1104 (e.g., a set of $N_p$ directions of interest $\mathcal{D}$) and performs the assignment step as described before. The outputs 1106a, 1106b, and 1106c of the direction-to-beam assignment block 1102 is the set of directions for each beam codeword, which is effectively the coverage requirements for the beam codewords to be updated in the subsequent update step. For example, output 1106a is the updated coverage requirement (e.g., set of directions ($\theta, \phi$)) for beam 1, output 1106ba is the updated coverage requirement (e.g., set of directions ($\theta, \phi$)) for beam 2, and output 1106c is the updated coverage requirement (e.g., set of directions ($\theta, \phi$)) for beam k. The beam codebook update block 1108 performs the beam codeword update step as described before. There can be one beam codeword generation block for each beam codeword. In this illustrative embodiment, the beam codebook update block 1106 includes beam codeword generation block 1000a, beam codeword generation block 1000b, and beam codeword generation block 1000c.

In this illustrative embodiment, each of the beam codeword generation blocks 1000 receives the updated coverage requirements 1106 as well as a utility function 1110, which is determined according to the design requirements on the beam codebook and described in more detail in FIG. 10. The output from each of the beam codeword generation blocks 1000 is the updated beam codeword. For example, output 1112a is the updated beam codeword for beam 1, output 1112b is the updated beam codeword for beam 2, and output 112c is the updated beam codeword for beam k. The outputs 1112 are provided to direction-to-beam assignment block 1102. The final beam codebook 1114 is produced when the terminating condition is met.

To generate a codebook with wide beams, the non-decreasing concave utility function can be selected as described before and provided as inputs 1110a, 1110b, and 1110c to the beam codeword generation blocks 1000a, 1000b, and 1000c as shown in FIG. 11. Similarly, to generate a codebook maximizing the average data rate can be achieved by providing the Shannon channel capacity (e.g., or expressions of data rates achieved by practical communication systems as inputs 1110a, 1110b, and 1110c to the beam codeword generation blocks 1000a, 1000b, and 1000c as shown in FIG. 11.

Hierarchical Codebook Design

To support high throughput, 5G mmWave BSs and UEs will need to implement narrow beams. To reduce beam searching time, a wide beam can be used first to identify possible angular regions, then narrowed. Hierarchical codebooks can be designed with the root node representing the widest beam and nodes that have progressively greater depths from the root node represent progressively narrower beams. Beam searching times can be reduced using such a hierarchical codebook. In addition, beam searching times can be further reduced by adapting the hierarchical codebooks, as described in more detail in the embodiments provided below.

Inputs for the Hierarchical Codebook Design

The electromagnetic field data of antenna elements can be the inputs to generate the hierarchical codebook. The electromagnetic field data include but not limited to:

the direction and strength of the electrical field radiated by each antenna element measured/simulated on a sphere enclosing the antenna arrays, and the direction and strength of the magnetic field radiated by each antenna element measured/simulated on a sphere enclosing the antenna arrays.

The electrical field data can be obtained by:

electromagnetic simulation software (for example, the 'rE' results from HFSS);

measurement, for example, in an anechoic chamber; and/or generation through steering vectors. The E-field response data $e(\theta,\phi)$ at the direction $(\theta,\phi)$ of an array with antenna element pattern off $(\theta,\phi)$ is as follows:

$$e(\theta,\phi)^T \triangleq [e_1(\theta,\phi), e_2(\theta,\phi), \ldots e_N(\theta,\phi)] =$$

$$cf(\theta,\phi)\exp\left(j\frac{2\pi}{\lambda}[\sin\theta\cos\phi, \sin\theta\sin\phi, \cos\theta]\begin{bmatrix} x_1 & \cdots & x_N \\ y_1 & \ddots & y_N \\ z_1 & \cdots & z_N \end{bmatrix}\right),$$

where N is the number of antenna elements, $(x_i, y_i, z_i)$ are the coordinates of the i-th antenna element, $\lambda$ is the wavelength, and c is a constant taking into account the radiation efficiency.

In one embodiment, the generated electrical field data can be interpolated to obtain the data on the other directions.

In one embodiment, the E-field data are organized in a matrix-form, which is denoted as M matrices hereafter. For the simulated or measured E-field data, the method to generate the M matrix is given in REF 1. For the E-field data generated through steering vectors, the M matrix for a given direction can be defined as $$M(\theta,\phi) = e(\theta,\phi)^c e(\theta,\phi)^T,$$

where $a^c$, $a^T$ stands for the conjugate and the transpose of a vector a, respectively.

The electrical field data may consist of finite sampling points, such as sampling points of constant density, i.e., uniformly or quasi-uniformly distributed on the sphere. For example, the Fibonacci grid generated in REF 2 consists of quasi-uniformly distributed points on the sphere. Another example of sampling points can include sampling points of constant stepsize. For example, sampling on a mesh grid $(\theta,\phi) = [0°:q_\theta: 180°] \times [0°:q_\phi:360°]$, where $q_\theta$, $q_\phi$ are the simulation or measurement step sizes.

Note that the electrical field data can also include the housing effects, for example, the absorption, reflection, blockage, scattering due to the metal frame, the cover or the screen of the terminal.

Beam Branching and Clustering Based on the E-Field Data

The hierarchical codebook can be designed by one of two approaches, namely, top-down and bottom-up. In the top-down approach, the beams are branched into children beams, whereas in the bottom-up approach, the beams are merged into parent beams. The branching and merging can be done based on the electromagnetic field data. Note that the methods shown below can also be applied to arbitrary array layout, including linear, planar, circular, cylinder, etc.

Beam Branching

Figure 12:
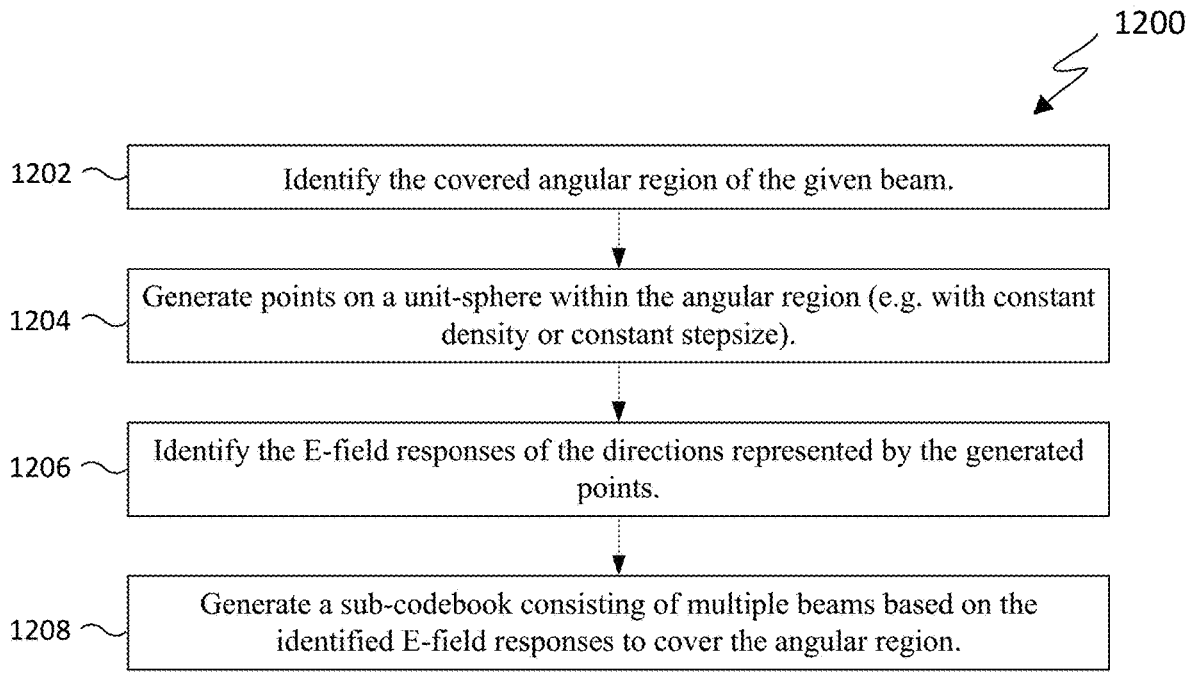
FIG. 12 illustrates a flowchart for a procedure for beam branching of a selected beam according to various embodiments of this disclosure.

FIG. 12 illustrates a flowchart for a procedure for beam branching of a selected beam according to various embodiments of this disclosure. Operations of flowchart 1200 can be implemented in a computing device, such as computing device 400 in FIG. 4.

Flowchart 1200 begins at operation 1202 by identifying the angular region covered by a given beam. This can be done by identifying the set of directions $(\theta,\phi)$ that the beam provides the most gain compared to the other beams. Another method of identifying the angular region is to identify the directions $(\theta,\phi)$ that are within the X dB beamwidth of the beam, where X can be 3. Denote that a beam has the angular region S as its covered region.

In operation 1204, points are generated on a unit sphere within the angular region. In one embodiment, the sampling points are generated according to constant density. In another embodiment, the sampling points are generated according to constant step size. Thereafter, in operation 1206, the electric field responses of the sampling points are generated. The electric field responses can be generated by simulations or measurements.

In operation 1208, a sub-codebook is generated based on the E-field data at the sampling points using the Greedy algorithm or Lloyd-Max algorithm given in REF 1. The sub-codebook can have a pre-defined size as an input or a variable size. Methods to decide the sub-codebook size, denoted as branching factor K, can include but not limited to any of the following:

Method 1: The ratio of the activated antenna numbers between the children beams and the parent beam. For example, if the number of activated antennas of children beams is twice of the parent beam, then the branching factor can be chosen as 2, since the beamwidth is approximately proportional to $$\frac{1}{N_a}$$

where $N_a$ is the number of the activated antennas.

Method 2: The ratio of the beamwidth of the parent beam and that of children beams. If the average beamwidth of the children beams is approximately $$\frac{1}{K}$$

of the parent beam, the branching factor can be chosen as K.

Method 3: The value of K can be decided by the performance of the current sub-codebook. That is, if the current sub-codebook of a certain size already meets a certain performance requirement such as coverage for the angular region S, stop adding more beams into the sub-codebook. This can be done for example if the Greedy algorithm is applied to generate the sub-codebook.

Beam Merging

Figure 13:
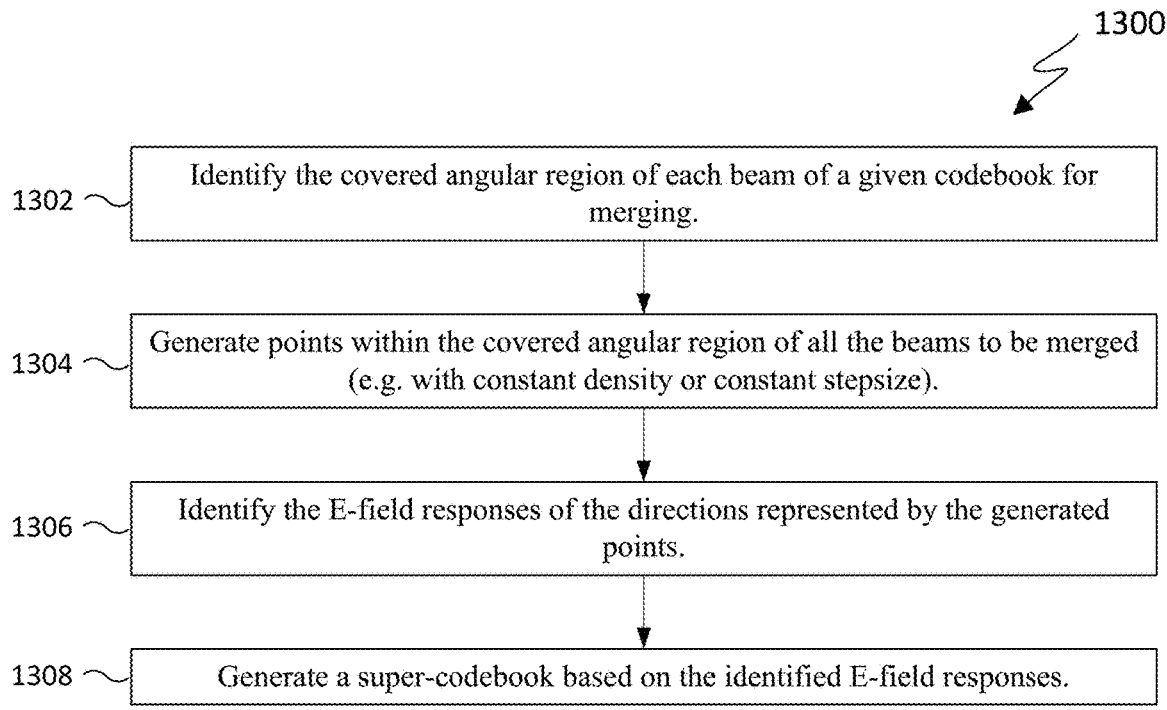
FIG. 13 illustrates a flowchart for beam merging according to various embodiments of this disclosure.

FIG. 13 illustrates a flowchart for beam merging according to various embodiments of this disclosure. Flowchart 1300 can be implemented in a computing device, such as computing device 400 in FIG. 4, to generate a super-codebook.

Flowchart 1300 begins at operation 1302 by identifying the covered angular region of each beam in a given codebook for merging. The covered region of each beam is the angular region where a beam achieves larger gain than all the other beams.

In operation 1304, sampling points are generated within the covered angular region for all of the beams to be merged. In some embodiments, the sampling points are generated with constant density. In other embodiments, the sampling points are generated with constant step size.

In operation 1306 the electric field responses are identified for the covered region of each beam. In operation 1308, a super-codebook can be generated based on the identified electric field response.

Figure 14:
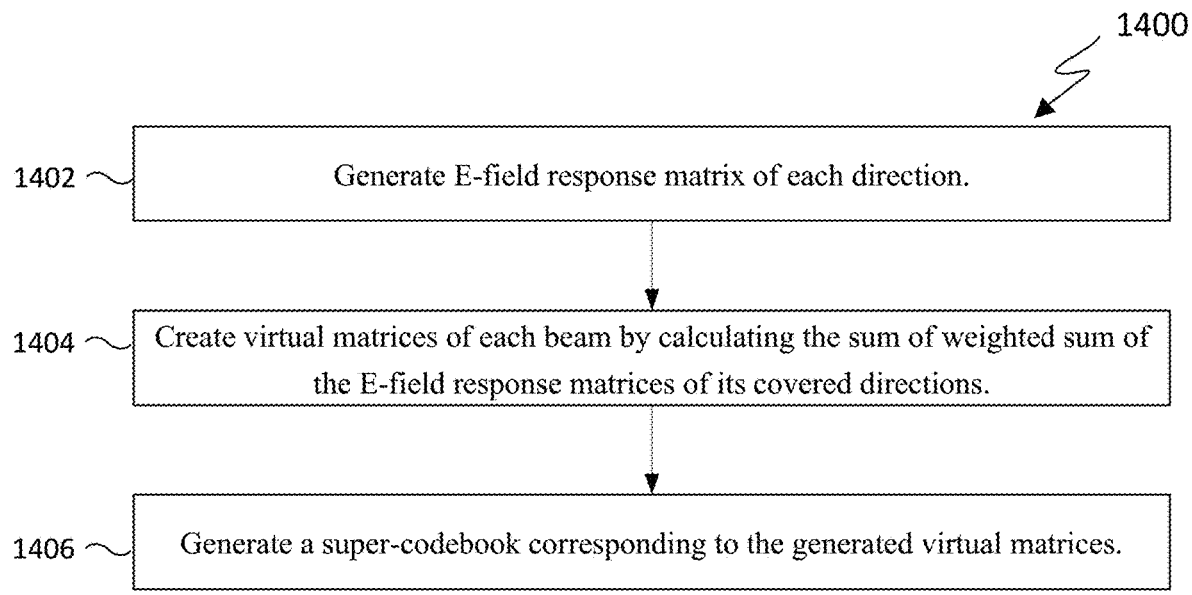
FIG. 14 illustrates a flowchart for generating a super-codebook according to various embodiments of this disclosure.

FIG. 14 illustrates a flowchart for generating a super-codebook according to various embodiments of this disclosure. Operations of flowchart 1400 can be implemented in a computing device, such as computing device 400 in FIG. 4.

Flowchart 1400 begins at operation 1402 by generating the electric field response matrix for each direction. This can be done by following the definition of $M(\theta,\phi)$ as described before. For each direction $(\theta,\varphi)$, there is an associated matrix $M(\theta,\phi)$ which is calculated based on the E-field responses of antenna elements and the matrix is used for gain computation. In operation 1404, virtual matrices of each beam are created by calculating the sum (or weighted sum) of the electric field response matrices of its covered direction. The virtual matrix for each beam can be defined by the following equation:

$$M_i = \triangleq \sum_{(\theta,\phi) \in S_i} M(\theta, \phi), \forall i,$$

where $S_i$ represents the covered region of beam i. Each virtual matrix can be seen the E-field response matrix associated with a virtual direction.

In operation 1406, the super-codebook can be generated to correspond with the virtual matrices. The super-codebook can be generated using the Greedy or the Lloyd-Max algorithm as described in REF 1 so that the super-codebook generated meets the design or performance requirement pertaining to the virtual directions.

Assume the number of beams before applying the merging operation is $N_1$. The number of beams after the merging operation, or the super-codebook size is $N_2$, where $N_1 > N_2$. The methods to decide the sub-codebook size, denoted as merging factor P, include but not limited to any one of the following methods.

Method 1. The ratio of the activated antenna numbers between the parent beams and the children beams. For example, if the number of activated antennas of parent beam is half of the children beam, then the merging factor can be chosen as ½, since the beamwidth is approximately proportional to $$\frac{1}{N_a}$$

where $N_a$ is the number of the activated antennas.

Method 2. The ratio of the beamwidth of the children beam and that of the parent beams. If the average beamwidth of the children beams is approximately $$\frac{1}{K}$$

of the parent beam, the merging factor can be chosen as $$\frac{1}{K}.$$

Method 3. The value of P can be decided by the performance of the current super-codebook. That is, if the current super-codebook of a certain size already meets a certain performance requirement such as coverage for the virtual directions, stop adding more beams into the super-codebook. This can be done for example if the Greedy algorithm is applied to generate the sub-codebook.

Hierarchical Codebook Structure

The structure of a hierarchical codebook can be regular or irregular. For a regular structure, each parent beam has the same number of children beams and all the leaf beams (i.e., beams without children) are at the same tier. In the description of the hierarchical codebooks that follow, the nodes may also be referred to as "beams". For example, a root node may be referred to as a root beam, and a leaf node may be referred to as a leaf beam.

Figure 15A:
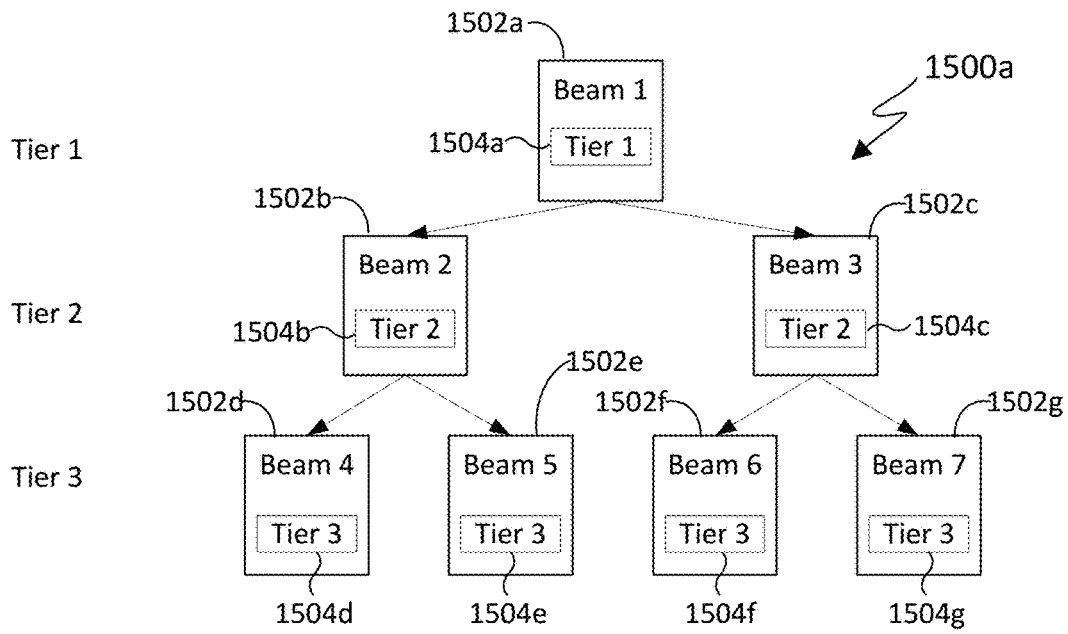
FIGS. 15A and 15B illustrate regular hierarchical codebooks according to various embodiments of this disclosure.
Figure 15B:
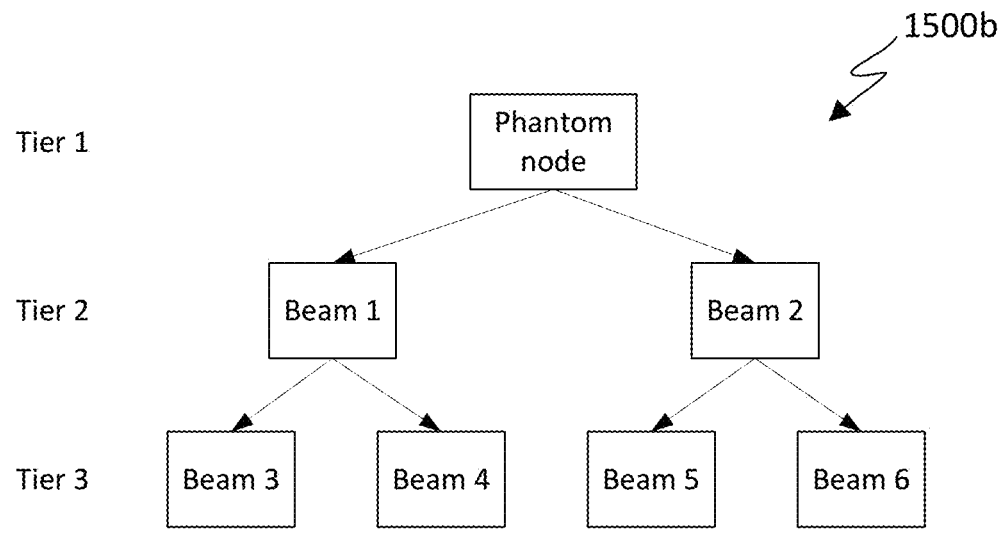

FIGS. 15A and 15b illustrate regular hierarchical codebooks according to various embodiments of this disclosure. In particular, hierarchical codebooks 1500a and 1500b are three-tiered codebooks with a binary tree structure. Note that throughout this disclosure, the Tier 1 beam can be a single valid beam as in FIG. 15A, or just a phantom node to maintain a tree structure of the codebook as in FIG. 15B. If the Tier 1 is a phantom node, the beam searching procedure will skip Tier 1 and starts from Tier 2 directly. Each node 1502 is associated with a tier identifier 1504 that indicates not only the tier assigned to a node but can also dictate an order in which the hierarchical codebook 1500a is traversed during a beam searching procedure.

The structure of a hierarchical codebook can also be irregular. An irregular tree structure can include branching factors that differ across different tiers, branching factors that differ within a tier, or leaf beams that are located on different tiers. Examples of irregular hierarchical codebook are shown in FIGS. 16A, 16B, and 16C.

Figure 16A:
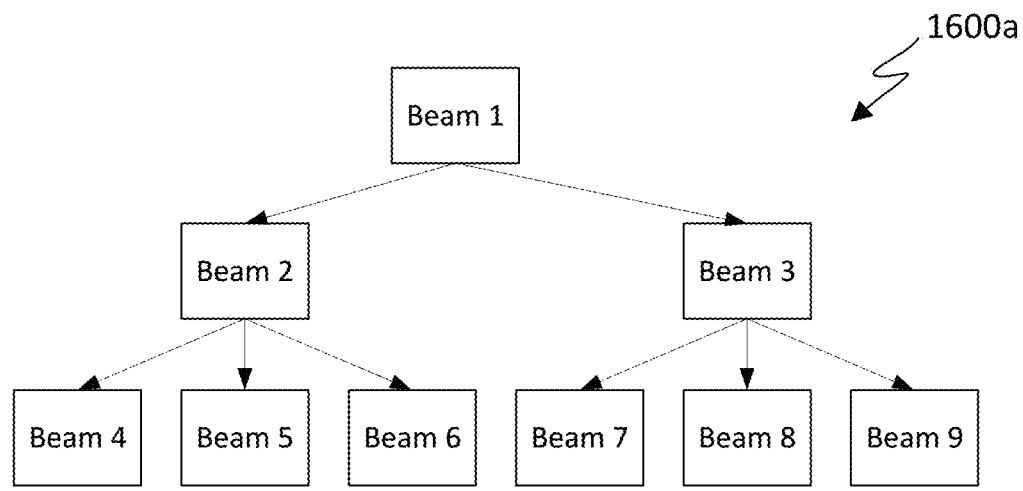
FIGS. 16A, 16B, and 16C illustrate irregular hierarchical codebooks according to various embodiments of this disclosure.
Figure 16B:
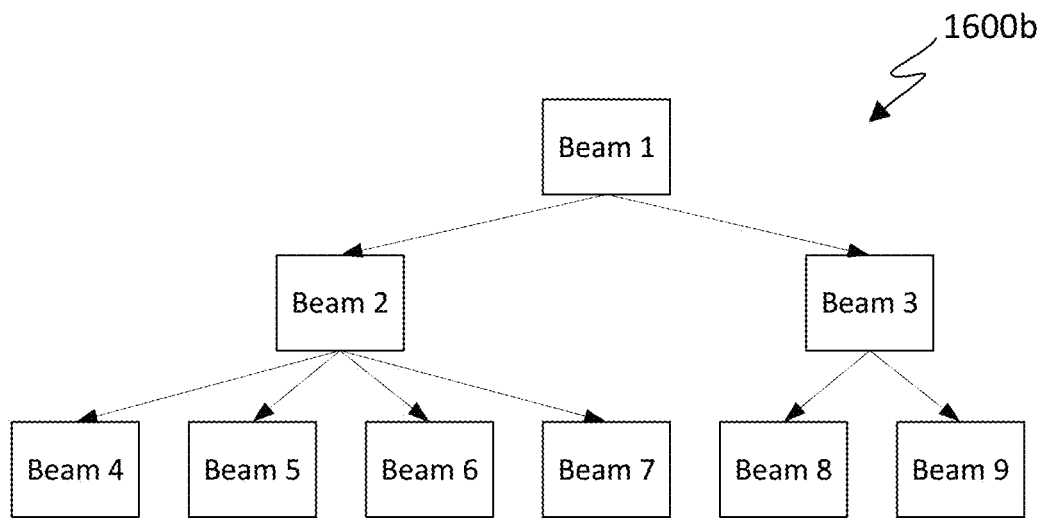
Figure 16C:
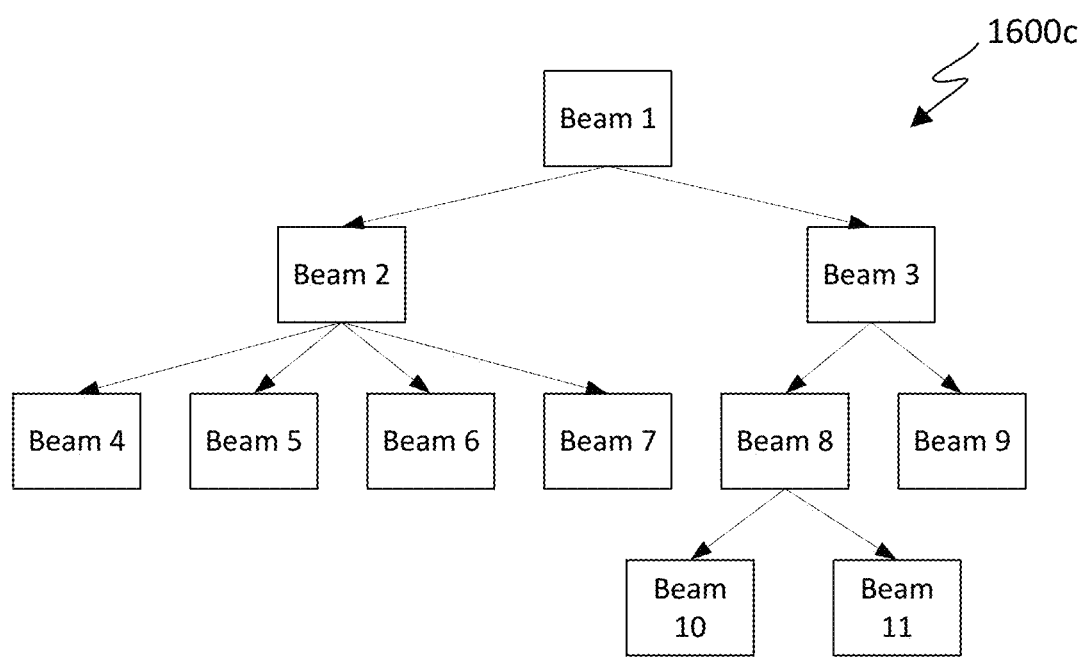

FIGS. 16A, 16B, and 16C illustrate irregular hierarchical codebooks according to various embodiments of this disclosure. Hierarchical codebook 1600a in FIG. 16A is irregular because it has different branching factors across different tiers. The branching factor between Tier 1 and Tier 2 is two and the branching factor between Tier 2 and Tier 3 is three. Hierarchical codebook 1600b in FIG. 16B is irregular because branching factors differ within a tier. For example, the branching factor of Beam 2 is four and the branching factor of Beam 3 is two. Lastly, hierarchical codebook 1600c in FIG. 16C is irregular because leaf beams are located on different tiers. Leaf beams are found in Tier 3, e.g., beams 4-7 and 9, and also Tier 4, e.g., beams 10 and 11.

Figure 17:
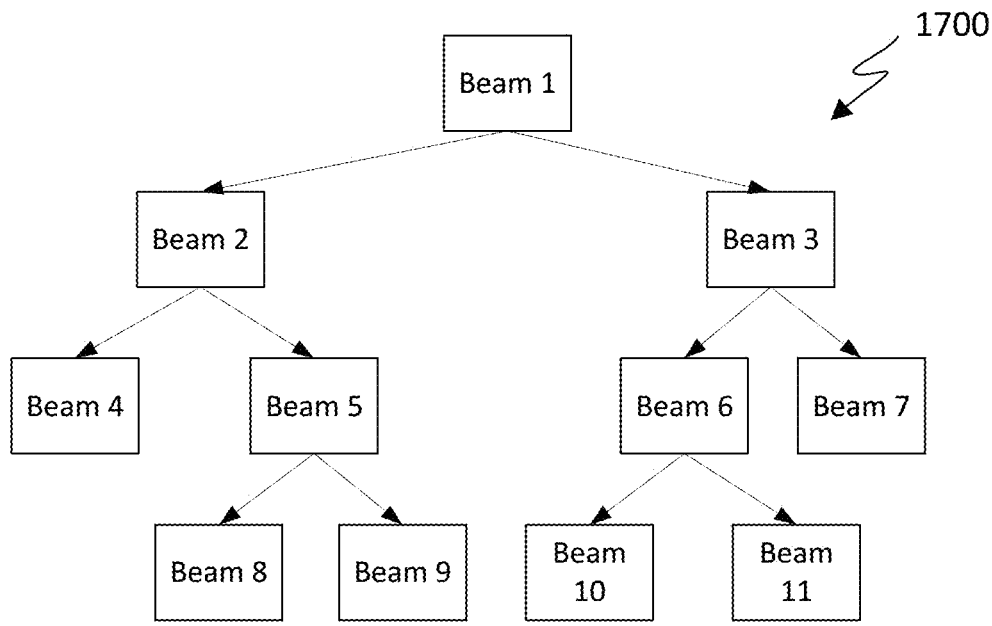
FIG. 17 illustrates an irregular hierarchical codebook with a binary tree structure according to various embodiments of this disclosure.

FIG. 17 illustrates an irregular hierarchical codebook with a binary tree structure according to various embodiments of this disclosure. In hierarchical codebook 1700, every parent beam has two children beams but the leaf beams may not be located at the same tier. For example, two leaf beams, Beam 4 and 7, are located at Tier 3, while the other four leaf beams are located at Tier 4. During each step of the beam searching procedure, the binary search is conducted. However, the number of steps is not fixed, and it can depend on the selected beams. The uneven distribution of the searching steps can help reduce the average searching steps.

When there are multiple antenna arrays, the hierarchical codebook can be designed separately or jointly as follows.

Separate approach. For each array and each codebook is represented by a tree (or a sub-tree). These trees, including subtrees, can have the same size and shape or different size and shape.

Joint approach. In this case, the multi-array hierarchical codebook can have a structure as a single tree. For example, the children beams with the same parent beam may associate with different arrays. The covered angular region of each array can be coordinated to achieve a better coverage with fewer number of beams.

In both the separate and joint approach, the number of beams associated with each array can be same or different. If the activation time/power is required to (approximately) be the same across arrays (the purpose of this requirement could be the avoidance of overheating of any array), the number of beams associated with each array should be (approximately) the same.

Tier-Dependent Design Metric of Hierarchical Codebook

For a hierarchical codebook with multiple tiers, there can be different design metric for each tier. Examples of the design metric are described below.

Metric 1: Mean beamforming gain of the composite radiation pattern. For example, $$E_{(\theta,\phi)}\left(\max_{w_i \in W^{(L)}} w_i^H M(\theta, \phi) w_i\right),$$

where $W^{(L)}$ represents the L-th tier codebook, and $w_i$ is a codeword.

Metric 2: Mean beamforming gain of the composite radiation pattern in the logarithmic scale. For example, $$E_{(\theta,\phi)}\left(\log\left(\max_{w_i \in W^{(L)}} w_i^H M(\theta, \phi) w_i\right)\right).$$

Metric 3: Shannon data rate of the composite radiation pattern, for example, $$E_{(\theta,\phi)}\left(\log\left(1 + \gamma \max_{w_i \in W^{(L)}} w_i^H M(\theta, \phi) w_i\right)\right)$$

where $\gamma$ stands for the end-to-end SNR except the beamforming gain.

Metric 4: Detection probability of the composite radiation pattern. The detection probability can be determined based on the channel model and channel gain, etc. For example, in the Rayleigh fading channel, the detection probability described in REF 3 is:

$$E_{(\theta,\phi)}\left(\exp\left(-\frac{\Gamma}{1 + \gamma \max_{w_i \in W^{(L)}} w_i^H M(\theta, \phi) w_i}\right)\right)$$

where $\gamma$ stands for the end-to-end SNR except the beamforming gain, and $\Gamma$ represents the detection threshold.

Metric 5: The x %-th (0<x<100) percentile CDF value of the composite radiation pattern.

In one embodiment, the higher tier codebooks adopt Metric 2 or Metric 4 as the design metric. The lower tier codebooks adopt Metric 1 or Metric 3 as the design metric. In another embodiment, the higher tier codebooks are designed to maximize the CDF value at a lower percentile (e.g., 20%) while the lower tier codebooks are designed to maximize CDF value at a higher percentile (e.g., 50% or 80%).

Top-Down Approach to Generate a Hierarchical Codebook

The top-down approach can be used to design both regular and irregular hierarchical codebooks.

Top-Down Approach to Generate a Regular Hierarchical Codebook

For the top-down approach, a top tier codebook of size $N_T$ hereafter, is first generated. It can be done by following the method described in REF 1. Other methods to generate a top tier codebook are not excluded. If $N_T=1$, then it is the single beam in the first tier. If $N_T$ is larger than one, then a phantom node is assigned to the first tier and the $N_T$ beams are put in the Tier 2.

Denote the codebook size of i-th tier By running the branching algorithm given in FIG. 12 for $N_i$ times, (i+1)-th tier codebook, which consists of $N_i$ sub codebooks and a total of $N_i K_i$ beams, is generated. This process can be repeated to generate the following tiers.

The values of $K_i$'s can be different for each tier or can be same across all the tiers. Values of $K_i$'s can be determined by any of the following exemplary but non-limiting methods.

Method 1. The values of $K_i$'s can be a part of the inputs to the algorithm or can be directly calculated based on the inputs of codebook size of each tier, i.e.

$$K_i = \frac{N_{i+1}}{N_i}.$$

Method 2. The values of $K_i$'s can be determined by the algorithm itself. For example, if the number of activated antennas of a lower tier is twice of the upper tier, then the branching factor can be chosen as 2 since the beamwidth is approximately proportional to $$\frac{1}{N_a},$$

where $N_a$ is the number of the activated antennas.

Method 3. If the average beamwidth of the lower tier beams is approximately $$\frac{1}{K}$$

of the upper tier, the branching factor can be chosen as K.

Method 4. The choice of $K_i$'s can be decided per the limitation on the beam searching time and the throughput of the feedback link between the transmitter and receiver. For instance, when the transmitter is performing beam search, the receiver has to feedback the received signal strength of the various beams or the index of the best beam to the transmitter such that the transmitter can choose the suitable sub-codebook from the next tier accordingly. If the receiver can feedback frequently, it can be advantageous to generate a codebook with small branching factor and many tiers. Otherwise, a codebook with a large branching factor but less tiers may be preferred.

Figure 18:
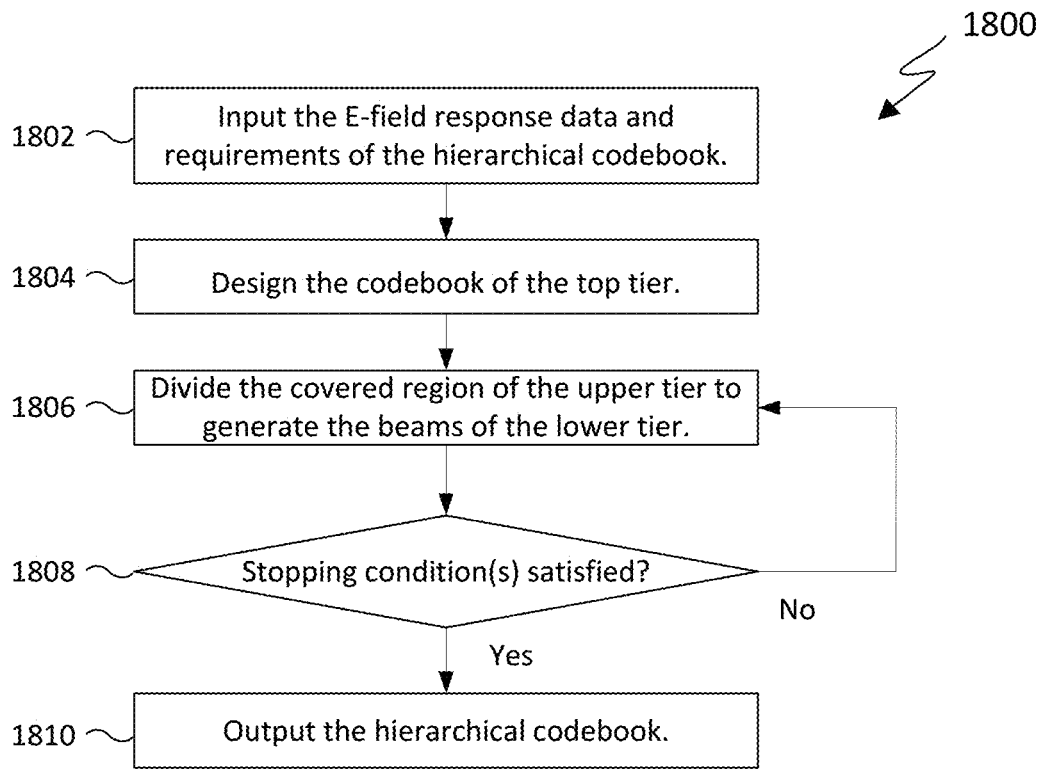
FIG. 18 illustrates a flowchart for designing a hierarchical codebook with a top-down approach according to various embodiments of this disclosure.

FIG. 18 illustrates a flowchart for designing a hierarchical codebook with a top-down approach according to various embodiments of this disclosure. Operations of flowchart 1800 can be implemented in a computing device such as computing device 400 in FIG. 4.

Flowchart 1800 begins at operation 1802 by inputting the electric field response data and requirements of the hierarchical codebook. Examples of the hierarchical codebook requirements can include the codebook size of each tier, branching factor of each tier, etc. In operation 1804, the top tier of the codebook is designed. In operation 1806, the covered region of the upper tier is divided to generate beams of a lower tier. In a non-limiting embodiment, the branching procedure described in flowchart 1200 can be used to generate additional tiers until a stopping condition is met.

In operation 1808, a determination is made as to whether a stopping condition satisfied. Examples of stopping conditions can include:

the required number of tiers are generated;
the mean gain of the last tier is above a threshold;
the number of beams in the last tier is larger than a threshold;
the covered region of all the beams in the last tier is less than a threshold; and
the covered region of at least one beam in the last tier is less than a threshold.

If the stopping condition is not satisfied in operation 1808, the flowchart 1800 returns to operation 1806. If the stopping condition is satisfied, then flowchart 1800 proceeds to operation 1810 and outputs the hierarchical codebook.

Note that the covered region of each beam can be disconnected in the angular domain. The algorithm can be applied to any shape of covered regions.

Top-Down Approach to Generate an Irregular Hierarchical Codebook

Figure 19:
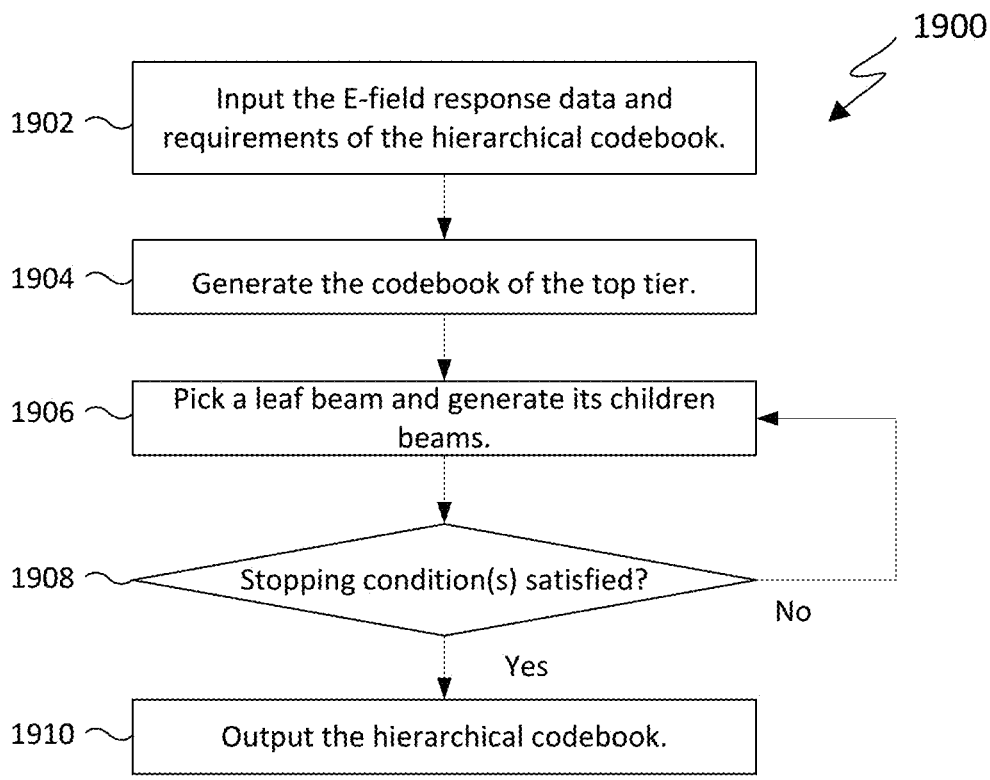
FIG. 19 illustrates a flowchart for a top-down approach for designing an irregular hierarchical codebook according to various embodiments of this disclosure.

FIG. 19 illustrates a flowchart for a top-down approach for designing an irregular hierarchical codebook according to various embodiments of this disclosure. Operations of flowchart 1900 can be implemented in a computing device, such as computing device 400 in FIG. 4.

Flowchart 1900 begins at operation 1902 by inputting the electric field response data and requirements of the hierarchical codebook. Examples of the hierarchical codebook requirements can include the codebook size of each tier, branching factor of each tier, etc. In operation 1904 the codebook of the top tier is generated. In one embodiment, the top tier beam can be designed to have a wide angular coverage. Since it does not have children beams at first, this beam is in the set of leaf beams.

In operation 1906, a leaf beam is picked, and its children beams are generated and embodied into a sub-codebook. In operation 1908 a determination is made as to whether a stopping condition is satisfied. If the stopping condition is satisfied, then flowchart 1900 proceeds to operation 1910 and the hierarchical codebook is outputted. If a stopping condition is not satisfied, then flowchart 1900 proceeds from operation 1908 to operation 1906 by selecting another leaf beam, excluding any previously picked leaf beam, and generating its children beams. The process is repeated until a stopping condition is satisfied.

Figure 20:
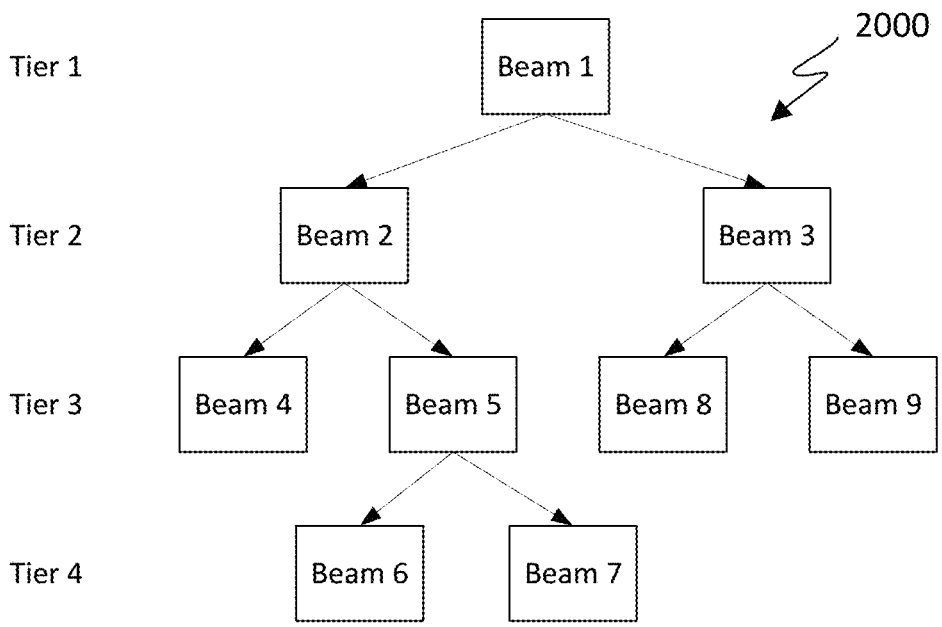
FIG. 20 illustrates an irregular, hierarchical codebook generated with a top-down approach according to various embodiments of this disclosure.

FIG. 20 illustrates an irregular, hierarchical codebook generated with a top-down approach according to various embodiments of this disclosure. The hierarchical codebook 2000 can be generated according to flowchart 1900 in FIG. 9.

After electric field data and hierarchical codebook requirements have been inputted, beam 1 is generated first at the top tier. As the only beam, beam 1 is picked and its two children beams, beam 2 and beam 3, are generated at tier 2. Because a stopping condition was not satisfied, beam 2 was selected as a leaf beam and branched into its two children beams, namely beam 4 and beam 5. Again, because no stopping condition was met, beam 5 was selected and branched into beam 6 and beam 7. Beam 3 is selected as a leaf beam and its children beams, beam 8 and beam 9, are generated. The hierarchical codebook 200 has an irregular structure since Tier 4 is not fully filled, i.e., some leaf beams of Tier 3 do not have children beams in Tier 4.

Non-limiting examples of criteria for selection of leaf beams for branching are listed below.

Criteria 1. The leaf beam with largest covered angular region.

Criteria 2. The leaf beam with the least mean gain over its covered region.

Criteria 3. The leaf beam mostly close to the top tier. If there are multiple leaf beams having the same distance to the top tier, then pick a leaf node randomly or apply a tie-breaking rule. The tie-breaking rule can be as follows:

The leaf beam with largest covered angular region or the leaf beam with the least mean gain over the covered region.

Criteria 4. If there are multiple arrays, the leaf node from the least activated arrays can be selected to maintain an (approximately) even distribution of activation time/power across arrays.

Non-limiting examples of stopping conditions are discussed below.

Example 1. Each leaf beam has a covered angular region less than a given threshold.

Example 2. The mean gain of each leaf beam is larger than a given threshold.

Example 3. The number of leaf beams reach its upper bound.

In another embodiment, the number of leaf beams of each beam determined according to the coverage area of the parent beam. For example, the number of leaf nodes can be linearly proportional to the coverage area of the parent beam. In one embodiment, the number of leaf nodes is determined by the Huntington-Hill method, which is shown in FIG. 21.

Figure 21:
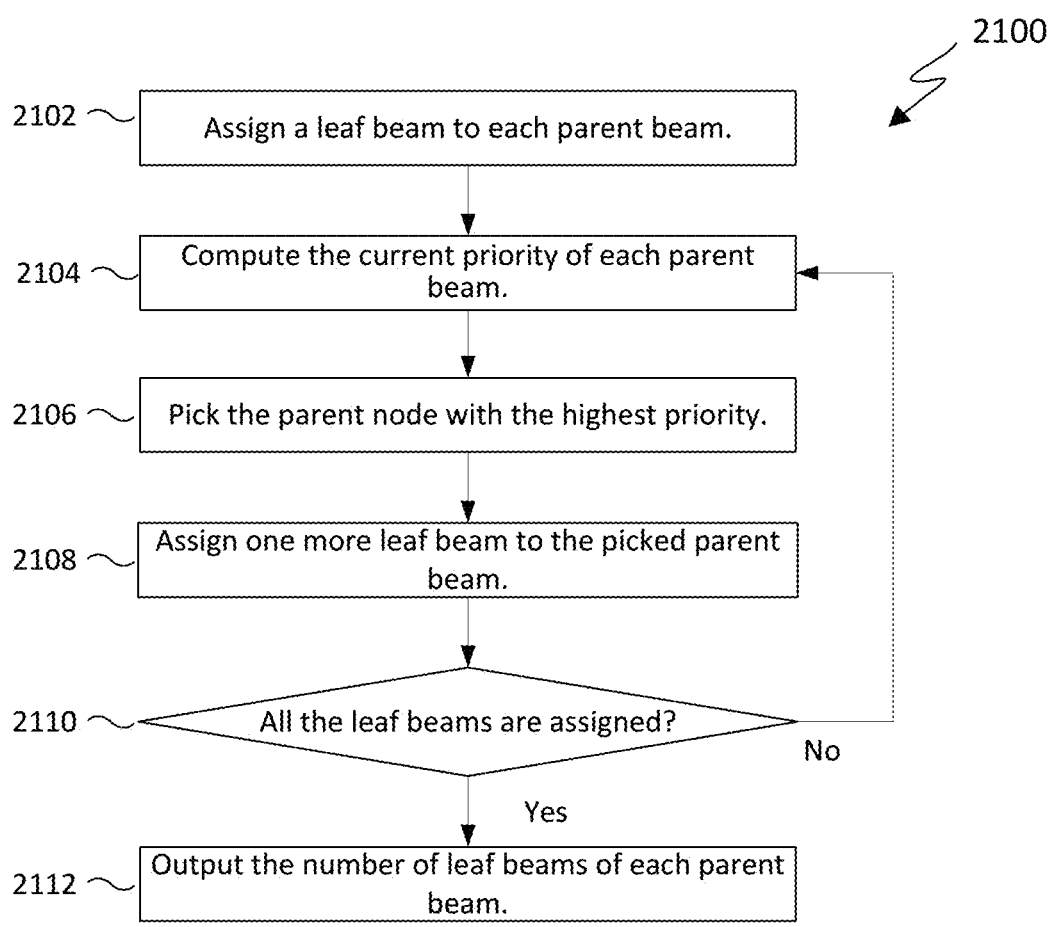
FIG. 21 illustrates a flowchart for determining a number of leaf beams according to various embodiments of this disclosure.

FIG. 21 illustrates a flowchart for determining a number of leaf beams according to various embodiments of this disclosure. Operations of flowchart 2100 can be implemented in a computing device, such as computing device 400 in FIG. 4.

Flowchart 2100 begins at operation 2102 by assigning a leaf beam to each parent beam. In operation 2104, a current priority of each parent beam is computed. In a non-limiting embodiment, the current priority is computed according to the following equation:

$$\text{Priority}(i) = \frac{A_i}{\sqrt{n_i(n_i + 1)}},$$

where $A_i$ is the coverage area of the i-th beam, and $n_i$ is the number of the leaf beams the i-th beam currently has before the possible allocation of the next leaf beam.

In operation 2106, the parent node with the highest priority is picked and in operation 2108, one more leaf beam is assigned to the picked parent beam.

In operation 2108 a determination is made as to whether all leaf beams have been assigned. If all the leaf beams have not been assigned, then flowchart 2100 returns to operation 2104 to allow computation of the current priority of each parent beam. If all leaf beams have been assigned, then flowchart 2100 proceeds from operation 2110 to operation 2112 and the number of leaf beams for each parent beam is outputted.

Bottom-Up Approach to Generate a Hierarchical Codebook

Hierarchical codebooks can also be generated using a bottom-up approach. In one non-limiting embodiment, the codebook size of each tier is given, and the codebook is then generated accordingly. In another non-limiting embodiment, the hierarchical codebook is generated with a structure of binary tree. However, the resultant codebook generated according to either of the two bottom-up embodiments may not have a regular structure.

Bottom-Up Approach to Design a Hierarchical Codebook with Specified Codebook Size To generate a hierarchical codebook according to this approach, the codebook size for each tier is assumed to be given as $[N_1, N_2, N_3, \ldots, N_L]$. The codebook size can be designed based on the activated antenna elements of each tier, the beamwidth of each tier, etc.

In the bottom-up approach, the bottom tier codebook is referred to as Tier L and is generated first. Tier L can be generated according to the Lloyd-Max or Greedy method provided in REF 1. Afterwards, the $N_L$ beams are merged into $N_{L-1}$ beams. The procedure is summarized in FIG. 22.

Figure 22:
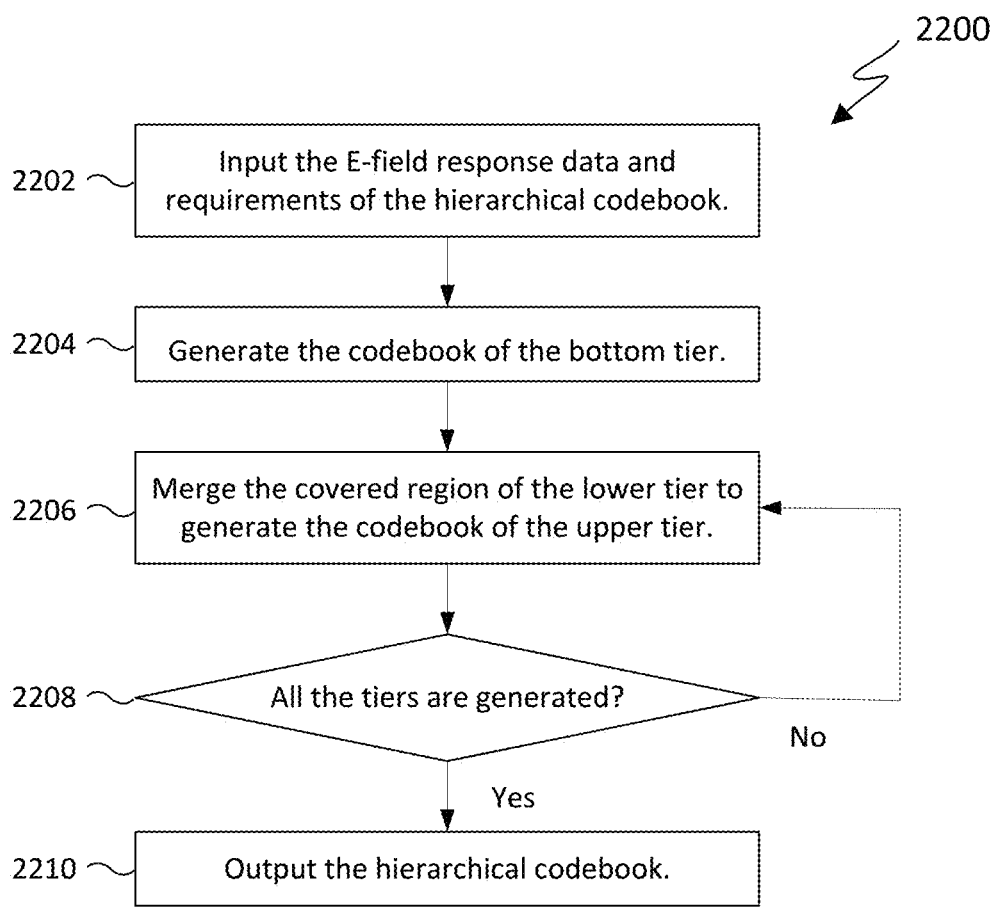
FIG. 22 illustrates a flowchart of a process for generating a hierarchical codebook with a specified codebook size according to various embodiments of this disclosure.

FIG. 22 illustrates a flowchart of a process for generating a hierarchical codebook with a specified codebook size according to various embodiments of this disclosure. Operations of flowchart 2200 can be implemented in a computing device, such as computing device 400 in FIG. 4.

Flowchart 2200 begins at operation 2202 by inputting the electric field response data and requirements of the hierarchical codebook. In operation 2204 the bottom tier of the codebook is generated. Thereafter, in operation 2206 the covered region of the lower tier is merged to generate the codebook of an upper tier.

In one embodiment, the merging can be achieved by following the procedure described below. Given the $N_L$ beams in the Tier L, the covered region of each beam can be identified. The covered region of a beam is the angular area where a beam achieves larger gain than all the other $N_L-1$ beams. Denote the coverage region of each beam as $S_1, S_2, \ldots, S_{N_L}$. Sampling points for each region can be generated using constant density or constant stepsize. As shown in REF 1, for each direction denoted by $(\theta,\phi)$, there is an associated matrix $M(\theta,\phi)$, which is calculated based on the E-field responses of antenna elements and is used for gain computation. Next, identify the M matrix for each direction and sum up the matrices in each covered region to create virtual matrices for Tier L-1 codebook generation as indicated below:

$$M_i^{(L-1)} = \sum_{(\theta,\phi) \in S_i} M(\theta, \phi), i = 1, 2, \ldots, N_L.$$

Each virtual matrix can be seen the E-field response matrix associated with a virtual direction. Last, the Lloyd-Max algorithm identified in REF 1 can be used to generate a codebook to cover these virtual directions. The Greedy algorithm from REF 1 can also be used, where $N_L$ candidate codewords can be first generated based on the $N_L$ virtual matrices and then $N_{L-1}$ codewords can be selected from the candidate pool.

Once the Tier L-1 codebook is generated, a determination is made in operation 2208 as to whether all the tiers of the hierarchical codebook has been generated. If all the tiers of the hierarchical codebook have been generated, then flowchart 2200 proceeds to operation 2210 and the hierarchical codebook is outputted. If all the tiers have not yet been generated, then flowchart 2200 returns to operation 2206 to generate the codebook for Tier L-2. First the association between the Tier L-1 beams and the virtual matrices are identified, i.e., the beam generating the largest gain for each virtual matrix is identified. Denote the indices of the matrices covered by i-th beam of Tier L-1 as a set $Q_i \subset \{1, 2, \ldots, N_L\}$. Virtual matrices can be created for Tier L-2 codebook generation to satisfy the following:

$$M_i^{(L-2)} = \sum_{j \in Q_i} M_j^{(L-1)}, i = 1, 2, \ldots, N_{L-1}.$$

Next, the Tier L-2 codebook can be generated by finding $N_{L-2}$ beams to cover the $N_{L-1}$ virtual matrices by Greedy or Lloyd-Max algorithm. The same steps can be adopted to design Tier i codebook from the Tier i+1 codebook. The procedure is summarized in the following figure.

Figure 23:
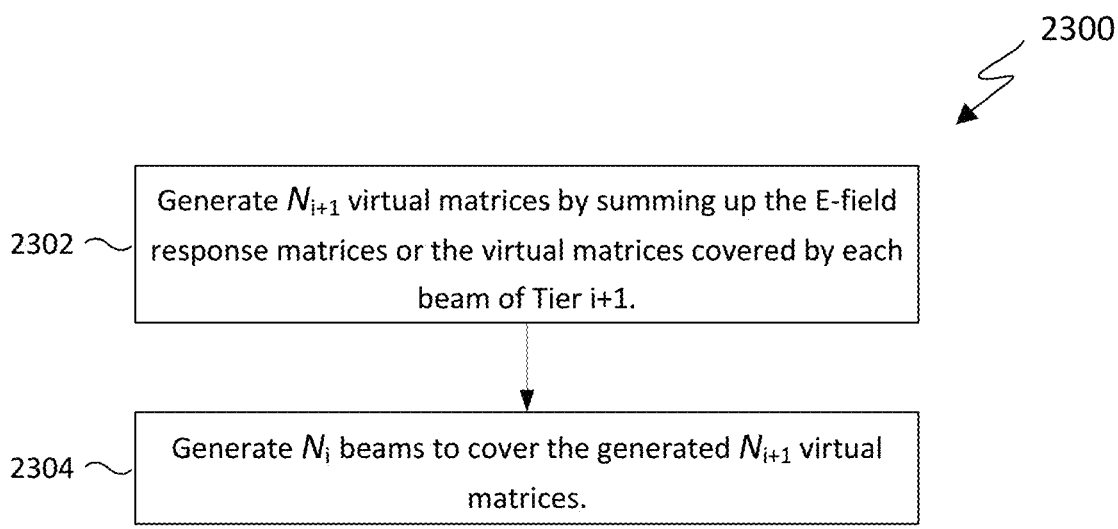
FIG. 23 illustrates a flowchart for generating a tier i codebook from a tier i+1 codebook according to various embodiments of this disclosure.

FIG. 23 illustrates a flowchart for generating a tier i codebook from a tier i+1 codebook according to various embodiments of this disclosure. Operations of flowchart 2300 can be implemented in a computing device, such as computing device 400 in FIG. 4.

Flowchart 2300 begins at operation 2302 where $N_{i+1}$ virtual matrices are generated by summing up the electric field response matrices of the virtual matrices covered by each beam of tier i+1. In operation 2304, $N_i$ beams are generated to cover the generated $N_{i+1}$ virtual matrices.

Note that in the bottom-up approach, the merging factor is not limited to be the same across the codebook. There could be varying number of beams from a lower tier beams merging into a single beam in the upper tier. Thus, the generated codebook may not have a regular structure.

Similar to the case of top-down approach, the covered region of each beam in the bottom-up approach can be disconnected in angular domain.

Figure 24:
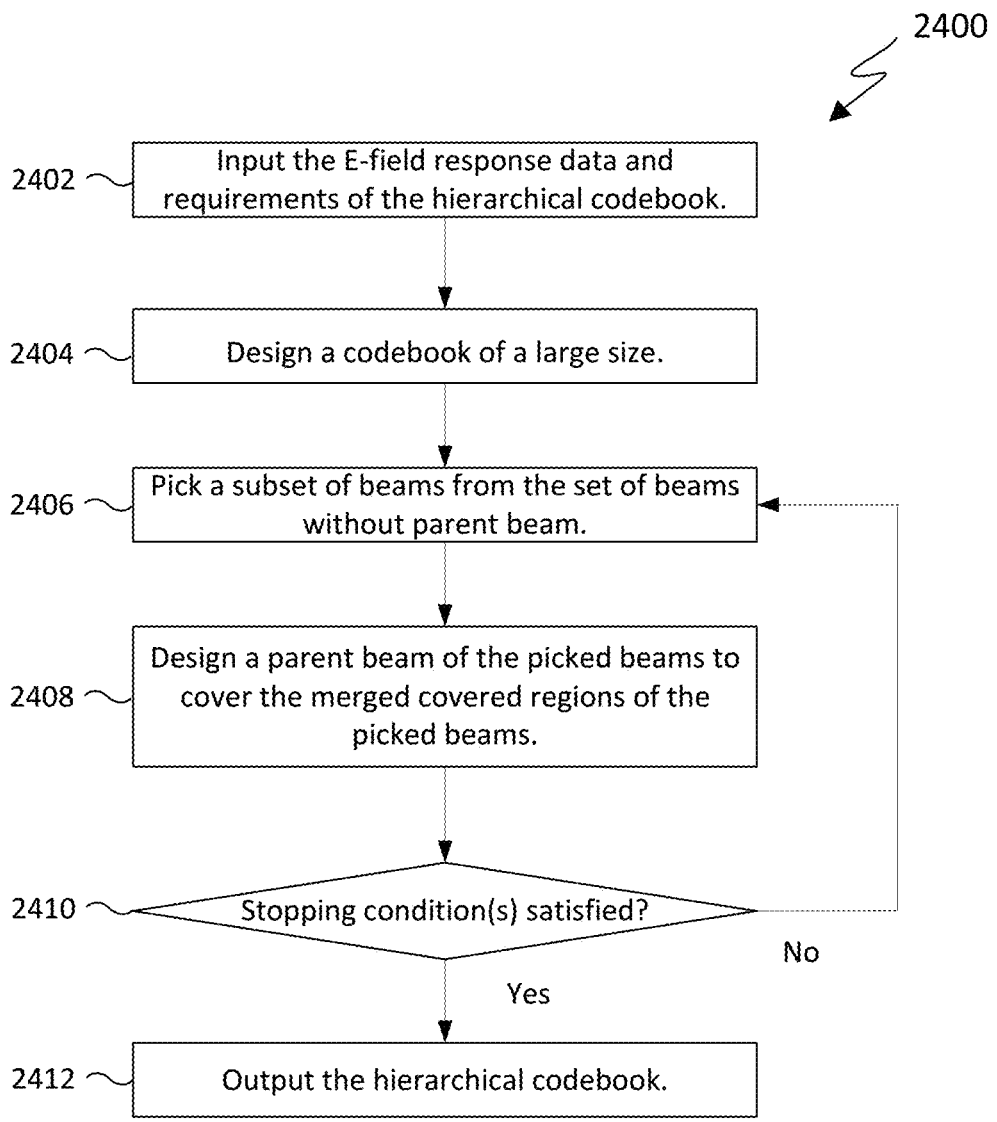
FIG. 24 illustrates a flowchart for generating a hierarchical codebook with binary tree structure according various embodiments of this disclosure.

Bottom-Up Approach to Design a Hierarchical Codebook without Specified Codebook Size When the codebook size of each tier is not given, the bottom-up approach can still be used to design a hierarchical codebook, as described in more detail in FIG. 24.

FIG. 24 illustrates a flowchart for generating a hierarchical codebook with binary tree structure according various embodiments of this disclosure. Flowchart 2400 can be implemented in a computing device, such as computing device 400 in FIG. 4.

Flowchart 2400 begins at operation 2402 by inputting the electric field response data and requirements of the hierarchical codebook. In operation 2404, a codebook of a large size is designed. In one embodiment, the design incorporates a set of beams that will merge in the algorithm later. As the codebook size of the bottom tier is not specified, the codebook size can be determined based on the average beamwidth and the size of required angular coverage region. Denote the codebook size as N. Then a codebook of size N can be generated by the Greedy or Lloyd-Max algorithm discussed in REF 1. N should be a large integer number at least larger than 2. A codebook with a variable size can also be designed by the Greedy algorithm.

To facilitate the description, the set of all the beams without parent beams is denoted as a set S. The N beams designed above belong to the set S as they do not have parent beams.

The covered angular region of each beam is identified. Next, a subset of beams from the set of beams without parents is picked in operation and their covered regions are merged into one region. In operation 2408 a beam is designed to cover the merged region. This new generated beam is denoted as the parent beam of the picked beams. Now the set S only includes N−$N_p$+1 beams if $N_p$ is the number of beams being merged.

In operation 2410 a determination is made as to whether a stopping condition is satisfied. If a stopping condition is not satisfied, then flowchart 2400 returns to operation 2406 and a subset of beams from the set S is picked again to design another parent beam. The process iterates until a determination is made in operation 2410 that the stopping condition is satisfied. Once the stopping condition is satisfied, flowchart 2400 proceeds to operation 2412 where the hierarchical codebook is outputted.

In one embodiment, the algorithm picks two beams at each time. The resulting hierarchical codebook has a structure of binary tree.

Figure 25:
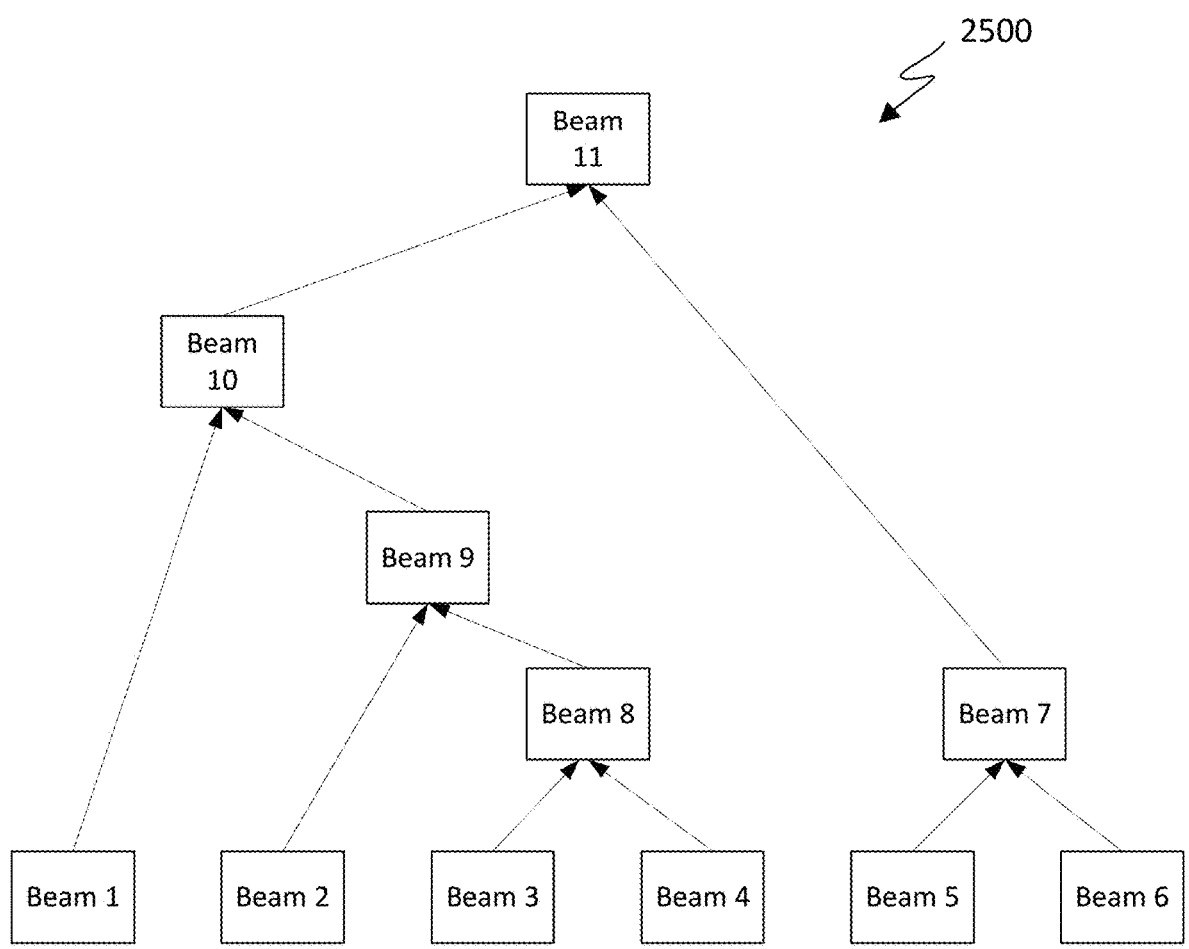
FIG. 25 illustrates a hierarchical codebook having a binary tree structure according to various embodiments of this disclosure.

FIG. 25 illustrates a hierarchical codebook having a binary tree structure according to various embodiments of this disclosure. In this embodiment, the hierarchical codebook 2500 was generated according to flowchart 2400 in FIG. 24, without a specified codebook size.

The algorithm first generates beams 1-6. Beam 5 and 6 are picked at the first step and merged into Beam 7. Then Beam 3 and 4 are then merged to generate Beam 8. Next, Beam 2 and Beam 8 are picked, and Beam 9 is generated. Beam 1 and Beam 9 are picked and merged to generate Beam 10. Beam 10 and beam 7 are picked last and merged to form Beam 11. In the generated hierarchical codebook, Beam 11 belongs to Tier 1, Beam 10 and 7 are at Tier 2, Beam 1, 9, 5, 6 belong to Tier 3, Beam 2 and 8 belongs to Tier 4, and Beam 3 and 4 are at Tier 5.

A non-limiting list of possible criteria for picking a subset of beams to merge is provided below.

Criteria 1. The k beams are selected by the K-Means algorithm based on their virtual M matrices. This can be done by following the procedure provided in FIG. 23 and setting $N_i=N_{i+1}-k+1$.

Criteria 2. The k beams pointing to similar directions. This metric need evaluate the closeness of two angular regions.

Criteria 3. The similarity of the virtual M matrices of the beams.

Criteria 4. Find the least activated array, which is the array with least beams until now. Pick k similar beams associated with this array to merge.

Criteria 5. The k beams with the least covered angular region.

Criteria 6. If the usage probability of each beam is known or estimated (e.g., estimated based on the usage history or the size/direction of the angular region), then pick the k beams with the least probability. Note that the usage probability of each beam is the sum of its direct children beams.

In one embodiment, a pair of beams is picked in each merging step. A non-limiting list of possible criteria for picking a pair of beams to merge is included below.

Criteria 1. The two beams are selected by the K-Means algorithm based on their virtual M matrices. This can be done by following the procedure provided in FIG. 23 and setting $N_i=N_{i+1}-1$.

Criteria 2. The two beams pointing to similar directions. This metric need evaluate the closeness of two angular regions.

Criteria 3. The similarity of the virtual M matrices of the beams. Assume that two beams have the associated virtual matrices as $M_i$ and $M_j$. The gain loss of merging is $d_i=\|M_i v_{max}(M_i)\|-\|M_i v_{max}(M_i+M_j)\|$ and $d_j=\|M_j v_{max}(M_j)\|-\|M_j v_{max}(M_i+M_j)\|$, respectively, where $\|a\|$ is the 2-norm of a vector a, $v_{max}(A)$ are the unit-norm eigenvector of a matrix A associated with the maximal eigenvalue, respectively. The beam pair with minimum sum loss, i.e., $d_i+d_j$, can be selected.

Criteria 4. Find the least activated array, which is the array with least beams until now. Pick two similar beams associated with this array to merge.

Criteria 5. The two beams with the least covered angular region.

Criteria 6. If the usage probability of each beam is known or estimated (e.g., estimated based on the usage history or the size/direction of the angular region), then pick the two beams with the least probability. Note that the usage probability of each beam is the sum of his direct children beams.

The selection criteria can be combined to design other metrics. For example, a metric can be designed considering both the usage probability and the similarity of the virtual M matrices. An example procedure is as follows. First, the usage probability of the beams within the set S (i.e., the beams without parent beam) is sorted.

Examples of stopping conditions are indicated below.

Stopping condition 1. The beams are merged into a single beam (note that this beam can be a phantom beam as described in FIG. 15B).

Stopping condition 2. The number of tiers reaches the limitation.

Figure 26:
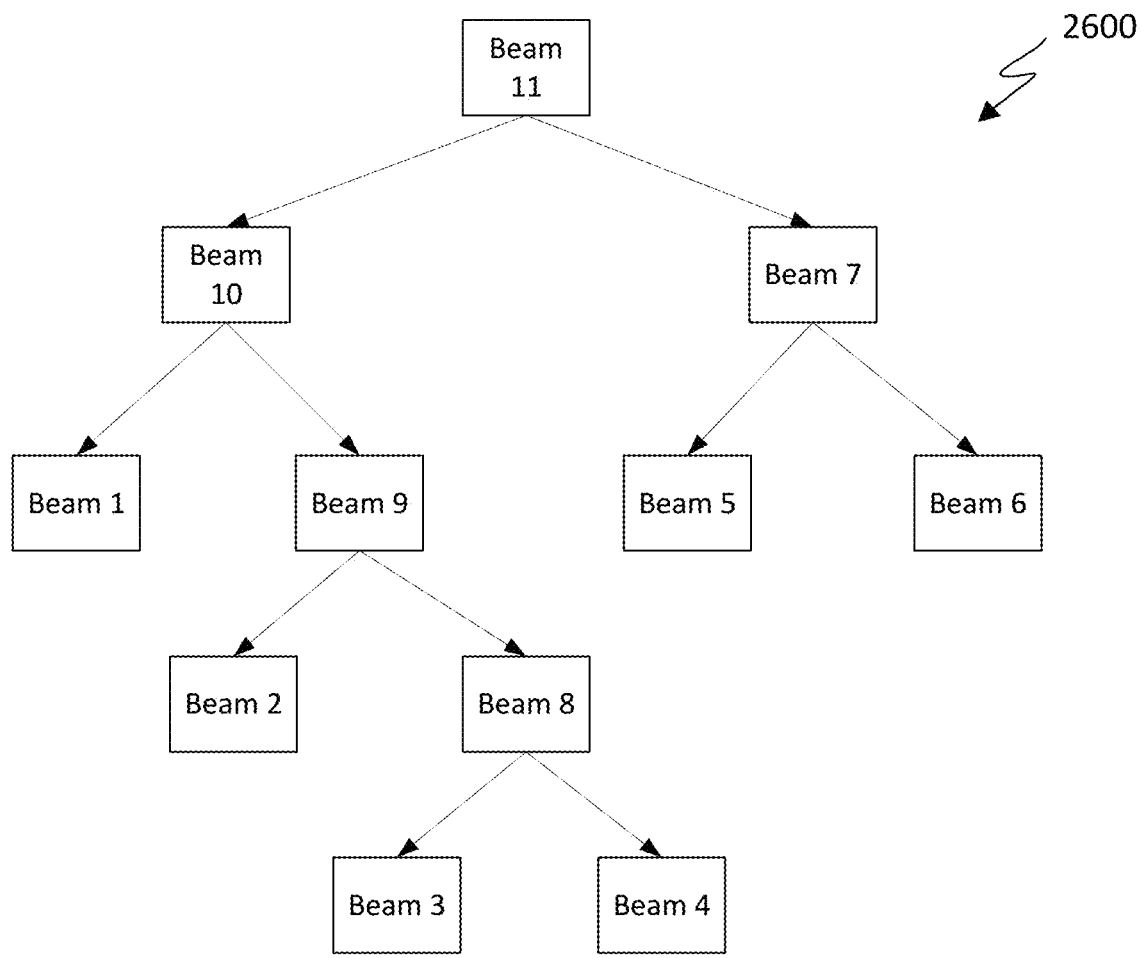
FIG. 26 illustrates a beam searching procedure for a hierarchical codebook according to various embodiments of this disclosure.

FIG. 26 illustrates a hierarchical codebook on which a beam searching procedure can be performed according to various embodiments of this disclosure. Hierarchical codebook 2600 is analogous to hierarchical codebook 2500 in FIG. 25.

In one embodiment, a beam searching procedure traverses hierarchical codebook 2600 based on tiers. Thus, a beam searching procedure first considers Beam 11 on Tier 1. The beam searching procedure then proceeds to consider Beam 10 and Beam 7 on Tier 2. The beam searching procedure proceeds by considering each beam on each tier before proceeding to the next furthest tier from Tier 1.

Bottom-Up Approach to Design an Adaptive Hierarchical Codebook

Figure 27:
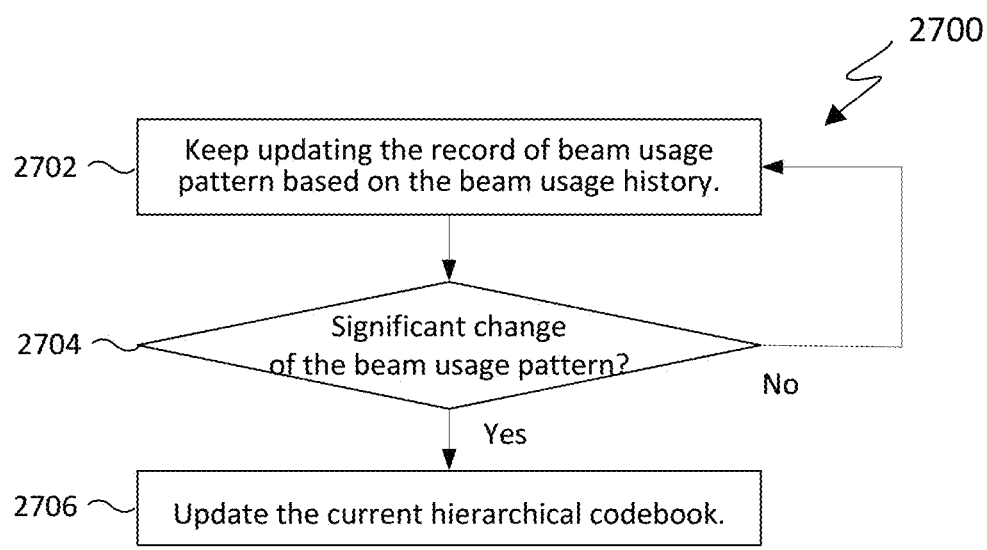
FIG. 27 illustrates a flowchart for adapting a hierarchical codebook according to various embodiments of this disclosure.

Assume that the device has an initial beam codebook. In one embodiment, the device is a UE. In another embodiment, the device is a base station. In either scenario, during the usage of the device, the usage probability of every beam can be recorded. The usage probability may also change with time. The hierarchical codebook can adapt its structure to the usage probability. The procedure is illustrated in FIG. 27.

The electronic device records its beam usage history. The beam usage history can include the selected beam for communications at each given time and beam searching duration and the index of the beam selected.

The electronic device can extract the beam usage pattern from the beam usage history. The beam usage pattern can include the probability that each beam is selected in a time interval (e.g., in the last week), as well as the average time length of beam search.

The electronic device can also track the beam usage pattern and decides to update/change the codebook structure once there are significant change of the usage pattern including the average time length of beam searching increases a lot recently, and the recent beam usage probabilities are different from that of the historical record.

The hierarchical codebook can be designed by the bottom-up approach as follows.

In one embodiment, assume there are N beams with usage probability as $p_1, p_2, p_3, \ldots, p_N$. The $k_1$ beams with the least probabilities are merged into one parent beam at the first step. The usage probability of this parent beam is calculated as the sum of its children beams. Then $k_2$ beams are picked from the $N-k_1+1$ beams with the least probabilities and design a parent beam. The process continues until all the beams are merged into a single beam (note that this beam can be a phantom beam as described in FIG. 15B.

In another embodiment, the merging process considers both the usage probabilities and other metrics listed in the Section "Bottom-up approach to design a hierarchical codebook without specified codebook size". For example, the beams with small probabilities and similar directions are picked for merging in each stage.

FIG. 27 illustrates a flowchart for adapting a hierarchical codebook according to various embodiments of this disclosure. Operations of flowchart 2700 can be implemented in an electronic device such as BS 102 in FIG. 2 or UE 116 in FIG. 3.

Flowchart 2700 begins at operation 2702 by continuing to update the record of beam usage pattern on the beam usage history.

In operation 2704 a determination is made as to whether a significant change of the beam usage pattern has been detected. If a significant change in the beam usage pattern has not been detected, then flowchart 2700 returns to operation 2702. However, if a significant change has been detected, then flowchart 2700 proceeds from operation 2704 to operation 2706 and the current hierarchical codebook is updated. Updating the hierarchical codebook can change a structure of the hierarchical codebook. In one embodiment, the hierarchical codebook is updated by changing the tier identifiers associated with each node. Updating the hierarchical codebook with nodes having updated tier identifiers changes a structure of the codebook and also changes a sequence in which the nodes are searched during a beam searching procedure.

In another embodiment, the hierarchical codebook is updated by merging beams. Merged beams are assigned to usage probability equal to the sum of the individual usage probabilities. In some instances, increased usage probabilities can result in a merged beam being assigned to a higher tier, i.e. a tier that is closer to the root node on Tier 1.

Extending the Children Beam Sets to Improve the Accuracy of the Hierarchical Structure When searching beam following the hierarchical structure, it may not always result in the best narrow beam. An example is given as follows. Assume there are 2 wide beams and 4 narrow beams. The WB1 has the children beam set {NB1, NB2}, while WB2 has the children beam set {NB3, NB4}, as given in TABLE 1. The beam pattern of the wide beams are narrow beams are given in FIG. 28.

TABLE 1

The hierarchical structure before extending the children beam set.

| Parent beam | Children beam set |
|---|---|
| WB1 | {NB1, NB2} |
| WB2 | {NB3, NB4} |

Figure 28:
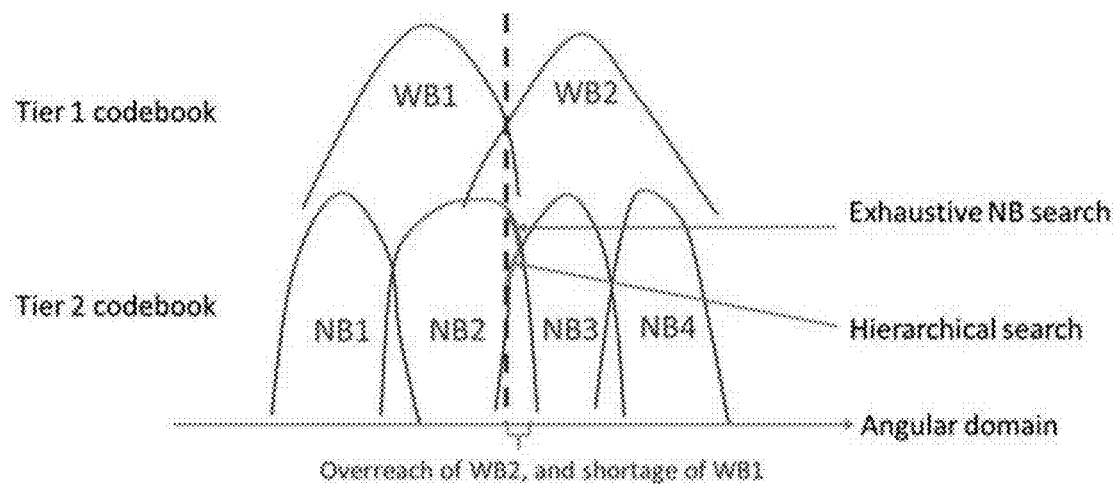
FIG. 28 illustrates a relationship between parent beams and children beams having an imperfect hierarchical structure according to various embodiments of this disclosure.

FIG. 28 illustrates a relationship between parent beams and children beams having an imperfect hierarchical structure according to various embodiments of this disclosure. Although the parent beams and their respective children beams are almost pointing to similar angular regions, the boundary between WB1 and WB2 is not exactly aligned with the boundary between NB2 and NB3. Therefore, if the signal is coming from an angle just on the right of the WB1-WB2 boundary, the hierarchical search will end up providing NB3 as the best narrow beam. However, the best narrow beam provided by exhaustive search is actually NB2. A mismatch exists between the exhaustive NB search and hierarchical search. The mismatch happens in the region where WB2 is the best while its children beams are not. This mismatch is identified in the overreach region of WB2, alternatively referred to as the shortage region of WB1.

In one embodiment, the children beam set is extended to improve the accuracy of the hierarchical search. The steps to extend the children beam set are given in FIG. 29.

Figure 29:
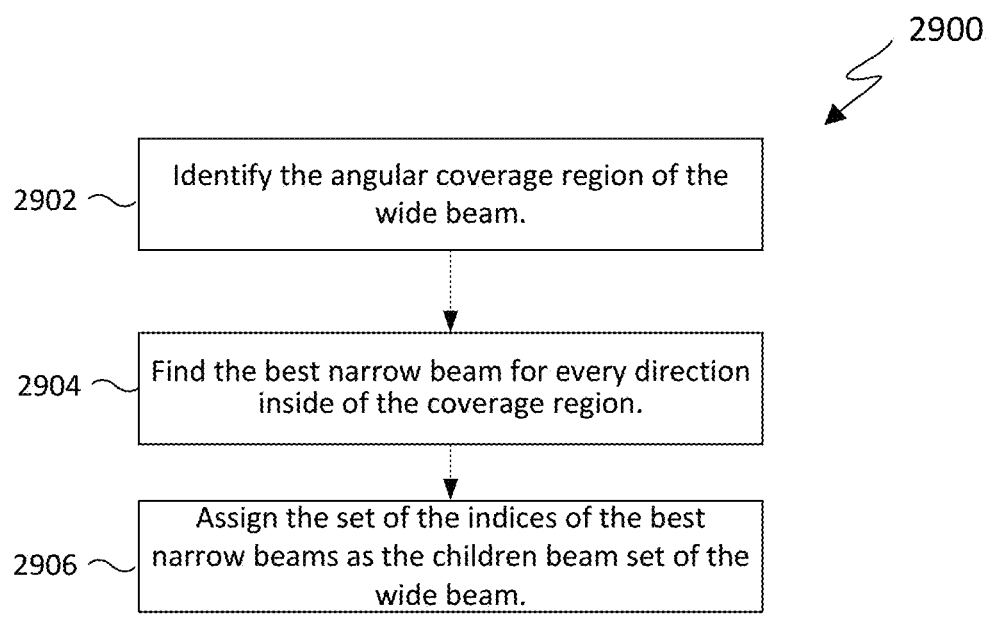
FIG. 29 illustrates a flowchart for extending a child beam set for a given wide beam using beam extension according to various embodiments of this disclosure.

FIG. 29 illustrates a flowchart for extending a child beam set for a given wide beam using beam extension according to various embodiments of this disclosure. Operations of flowchart 2900 can be implemented in a computing device, such as computing device 400 in FIG. 4.

Flowchart 2900 begins at operation 2902 by identifying the angular coverage region of the wide beam, i.e., where the wide beam is the best among all the wide beams. In operation 2904, a set of narrow beams are identified for directions within the coverage region. The set of narrow beams includes the best narrow beam for any direction inside the angular coverage region of the wide beam. In operation 2906, indices are assigned to the best narrow beams that form the children beam set of the wide beam.

The operations of flowchart 2900 are repeated for every wide beam. By doing so, the overreach region of every wide beam is eliminated, and the hierarchical search result is always aligned with the exhaustive narrow beam search if there is no multi-path in the wireless channel. Note that for a given narrow beam, it could be a child of more than one wide beams. The hierarchical structure is no longer a tree but instead a graph.

For the example given in FIG. 28 the children beam set of WB2 is extended to include NB2. The updated hierarchical is given in TABLE 2. As a result, the hierarchical search and the exhaustive search provides the same result, i.e., NB2 is identified, if the signal is coming from an angle just on the right of the WB1-WB2 boundary.

TABLE 2

The hierarchical structure after extending the children beam set.

| Parent beam | Children beam set |
|---|---|
| WB1 | {NB1, NB2} |
| WB2 | {NB3, NB4, NB2} |

In another embodiment, partial children beam set extension can be done to improve the accuracy but not completely eliminate the inaccuracy. During the partial extension, the children beam set is not extended as done in FIG. 29 to achieve 100% accuracy.

Figure 30:
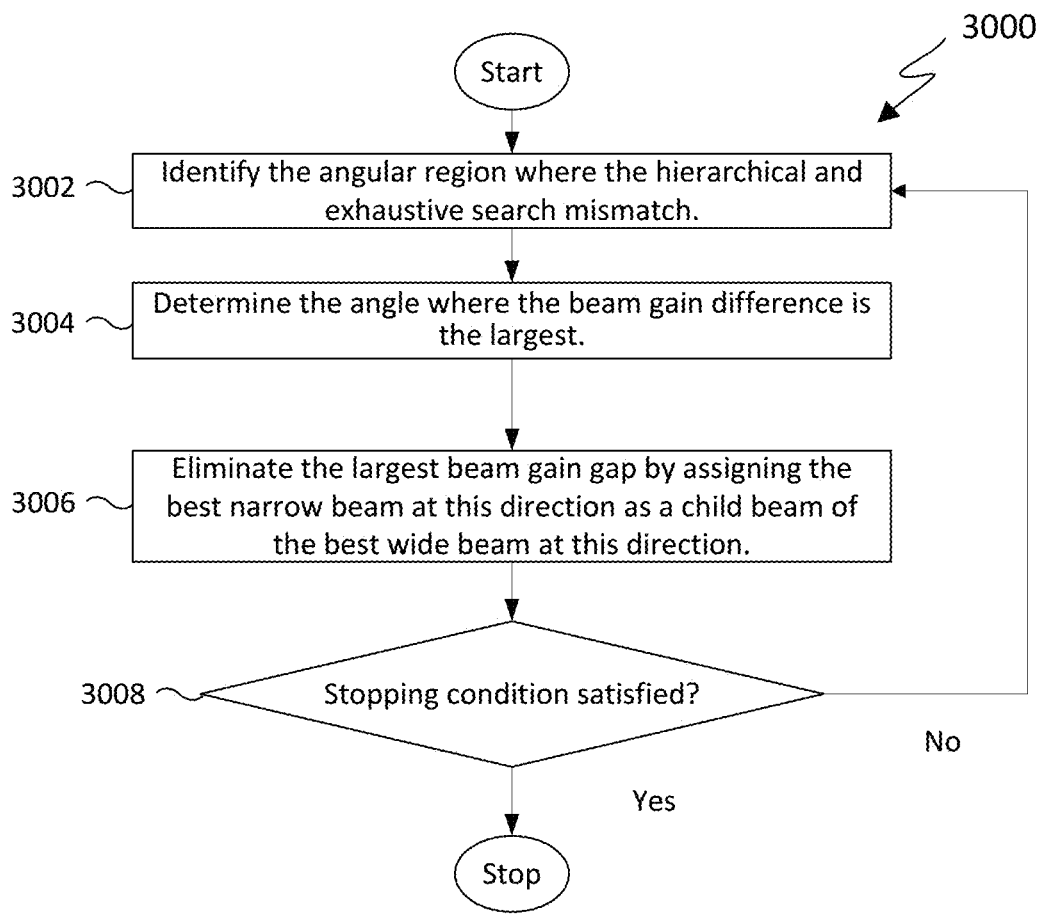
FIG. 30 illustrates a flowchart for partially extending a children beam set according to various embodiments of this disclosure.

FIG. 30 illustrates a flowchart for partially extending a child beam set according to various embodiments of this disclosure. Operations of flowchart 30 can be implemented in a computing device, such as computing device 400 in FIG. 4.

Flowchart 3000 begins in operation 3002 by identifying the angular region where the hierarchical search results and the exhaustive search results are mismatched in the current hierarchical structure. In operation 3004, the angle is determined within the identified angular region where the beam gain difference is the largest. In operation 3006, the beam gain gap is eliminated by assigning the best narrow beam index at this direction as a child beam to the best wide beam at this direction. In operation 3008 a determination is made as to whether a stopping condition is satisfied. If the stopping condition has not been satisfied, then flowchart 3000 returns to operation 3002. If the stopping condition has been satisfied, then flowchart 3000 terminates.

Non-limiting examples of stopping conditions for operation 3008 can include any of the following conditions.

Condition 1. The maximal beam gain difference between hierarchical search and exhaustive search is less than a threshold. That is to say, the goal is to limit the maximal gain loss due to hierarchical search.

Condition 2. The angular region where the beam search results differ between hierarchical search and exhaustive search is less than a threshold. That is to say, the goal is to limit the inaccuracy rate of hierarchical search.

Condition 3. The number of children beams reaches a threshold.

In yet another embodiment, the children beam set can be enforced to have the same size (i.e., the branching factor is same) after the children beam set extension or partial extension. In one approach, this can be done by ordering the child beams from a same parent beam by their coverage region overlap with the parent beam. For example, if K children beams per parent beam are allowed, then only the K children beams with the largest coverage overlap is kept in the set and remaining children beams are discarded. The procedure is given in FIG. 31 and it is done for every children beam set to enforce that every parent has K children beams. The size of the children beam set, i.e., K, can be dependent on the requirement on the accuracy or the largest gain gap between hierarchical and exhaustive search.

Figure 31:
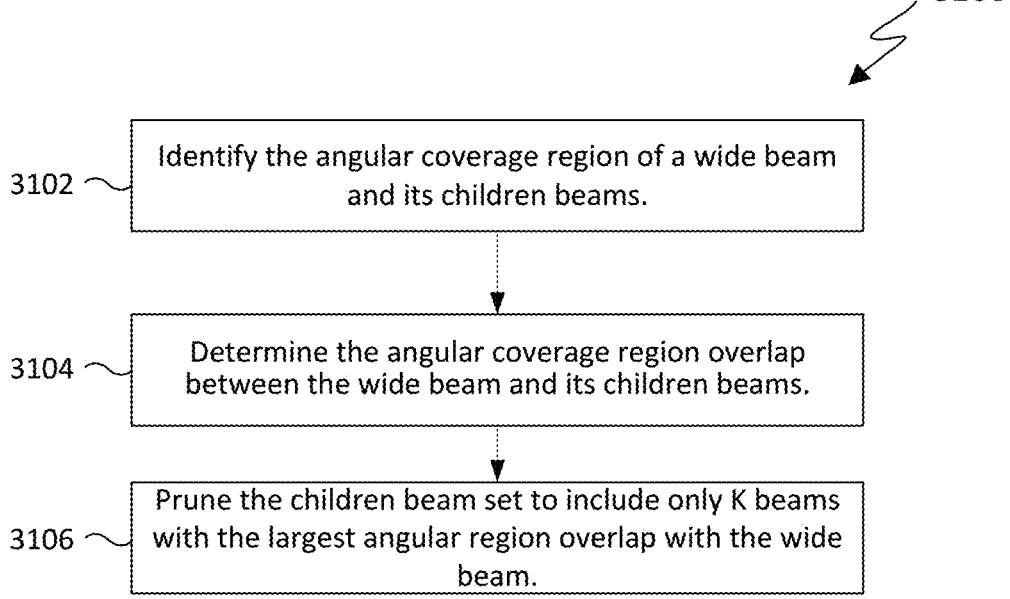
FIG. 31 illustrates a flowchart for pruning a child beam set for a given wide beam according to various embodiments.

FIG. 31 illustrates a flowchart for pruning a children beam set for a given wide beam according to various embodiments. Operations of flowchart 3100 can be implemented in a computing device, such as computing device 400 in FIG. 4.

Flowchart 3100 begins at operation 3102 by identifying the angular coverage region of a wide beam and its children beams. In operation 3104 the angular coverage region overlapping between the wide beam and its children beams are determined. In operation 3106, the children beam set is pruned to include only a predetermined number of beams, e.g., K beams, with the largest angular region overlap with the wide beam.

Figure 32:
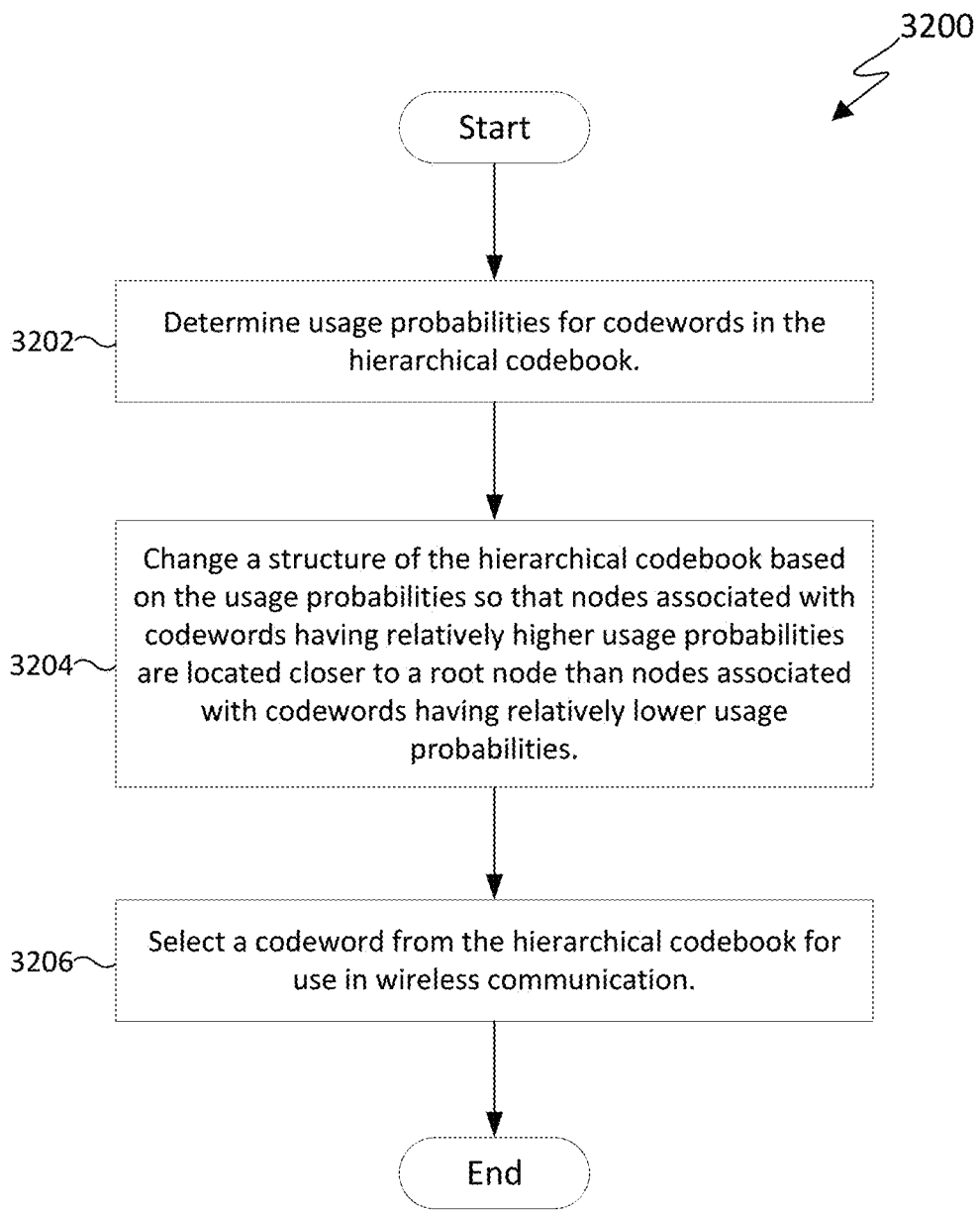
FIG. 32 illustrates another flowchart for adapting a hierarchical codebook according to various embodiments of this disclosure.

FIG. 32 illustrates another flowchart of a process for adapting a hierarchical codebook according to various embodiments of this disclosure. Operations of flowchart 2800 can be implemented in an electronic device, such as BS 102 in FIG. 2 or UE 116 in FIG. 3.

Flowchart 3200 begins at operation 3202 by determining usage probabilities for codewords in the hierarchical codebook. The codewords are represented by nodes assigned to one of a plurality of tiers of the hierarchical codebook based on a tier identifier.

In operation 3204, a structure of the hierarchical codebook is changed based on the usage probabilities so that nodes associated with codewords having relatively higher usage probabilities are located closer to a root node than nodes associated with codewords having relatively lower usage probabilities.

In operation 3206 a codework from the hierarchical codebook is selected for use in wireless communication, wherein the codeword is selected by a codeword selection procedure performed on the changed structure of the hierarchical codebook.

In some embodiments, changing the structure of the hierarchical codebook in operation 3204 comprises updating tier identifiers for the codewords in the hierarchical codebook based on the usage probabilities. The tier identifiers indicate an order of traversing the hierarchical codebook during the codeword selection procedure. In other embodiments, changing the structure of the hierarchical codebook in operation 3204 comprises merging two or more of the codewords based on usage probabilities and a similarity of angular direction.

A non-limiting embodiment of merging codewords includes the steps of identifying a first codeword with a first angular direction and a first usage probability; identifying a second codeword with a second angular direction and a second usage probability, the second angular direction being similar to the first angular direction; merging the first codeword and the second codeword to form a merged codeword with a combined usage probability that is a sum of the first usage probability and the second usage probability; and providing the merged codeword with an updated tier identifier based on the combined usage probability.

In another non-limiting embodiment, changing the structure of the hierarchical codebook in operation 3204 includes determining (i) whether recent search times for codeword selection procedures differ from historical search times for the codeword selection procedures or (ii) whether recent codeword usage probabilities differ from historical codeword usage probabilities, and then changing the structure of the hierarchical codebook based on the determination.

In one embodiment, determining the usage probabilities in operation 3202 includes identifying codeword usage patterns from a codeword usage history. The codeword usage patterns can include a probability that the codeword is selected for communication in a time interval and an average length of time for selecting the codeword.

In one embodiment, the hierarchical codebook described in FIG. 32 includes a set of best narrow beam codewords for directions within an angular coverage region of wide beam codewords in the hierarchical codebook. Each of the set of best narrow beam codewords is a child node of one of the wide beam codewords.

In one or more embodiments, the hierarchical codebook described in FIG. 32 is associated with at least two different branching factors. In addition, or alternatively, the hierarchical codebook described in FIG. 32 has leaf nodes on at least two different tiers. In addition, or alternatively, at least one of the codewords in the hierarchical codebook described in FIG. 32 is a child node for two or more codewords.

Although this disclosure has been described with an exemplary embodiment, various changes and modifications may be suggested to one skilled in the art. For example, this disclosure includes several embodiments that can be used in conjunction or in combination with one another, or individually. It is intended that this disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. An electronic device comprising:
a memory configured to store a hierarchical codebook; and
a processor operably connected to the memory, the processor configured to:
determine usage probabilities for codewords in the hierarchical codebook, wherein the codewords are represented by nodes assigned to one of a plurality of tiers of the hierarchical codebook based on a tier identifier;
change a structure of the hierarchical codebook based on the usage probabilities so that nodes associated with codewords having relatively higher usage probabilities are located closer to a root node than nodes associated with codewords having relatively lower usage probabilities; and
select a codeword from the hierarchical codebook for use in wireless communication, wherein the codeword is selected by a codeword selection procedure performed on the changed structure of the hierarchical codebook.

2. The electronic device of claim 1, wherein to change the structure of the hierarchical codebook, the processor is configured to (i) update tier identifiers for the codewords in the hierarchical codebook based on the usage probabilities, wherein the tier identifiers indicate an order of traversing the hierarchical codebook during the codeword selection procedure or (ii) merge two or more of the codewords based on usage probabilities and a similarity of angular direction.

3. The electronic device of claim 2, wherein to merge the codewords the processor is further configured to:
identify a first codeword with a first angular direction and a first usage probability;
identify a second codeword with a second angular direction and a second usage probability, wherein the second angular direction is similar to the first angular direction;
merge the first codeword and the second codeword to form a merged codeword with a combined usage probability that is a sum of the first usage probability and the second usage probability; and
provide the merged codeword with an updated tier identifier based on the combined usage probability.

4. The electronic device of claim 1, wherein to change the structure of the hierarchical codebook the processor is further configured to determine (i) whether recent search times for codeword selection procedures differ from historical search times for the codeword selection procedures or (ii) whether recent codeword usage probabilities differ from historical codeword usage probabilities, and
wherein the structure of the hierarchical codebook is changed based on the determination.

5. The electronic device of claim 1, wherein to determine the usage probabilities the processor is configured to identify codeword usage patterns from a codeword usage history, wherein the codeword usage patterns include a probability that the codeword is selected for communication in a time interval and an average length of time for selecting the codeword.

6. The electronic device of claim 1, wherein the hierarchical codebook comprises a set of best narrow beam codewords for directions within an angular coverage region of wide beam codewords in the hierarchical codebook, wherein each of the set of best narrow beam codewords is a child node of one of the wide beam codewords.

7. The electronic device of claim 1, wherein:
the hierarchical codebook is associated with at least two different branching factors, or
the hierarchical codebook has leaf nodes on at least two different tiers, or
at least one of the codewords is a child node for two or more codewords.

8. A method for adapting a hierarchical codebook, the method comprising:
determining usage probabilities for codewords in the hierarchical codebook, wherein the codewords are represented by nodes assigned to one of a plurality of tiers of the hierarchical codebook based on a tier identifier;
changing a structure of the hierarchical codebook based on the usage probabilities so that nodes associated with codewords having relatively higher usage probabilities are located closer to a root node than nodes associated with codewords having relatively lower usage probabilities; and
selecting a codeword from the hierarchical codebook for use in wireless communication, wherein the codeword is selected by a codeword selection procedure performed on the changed structure of the hierarchical codebook.

9. The method of claim 8, wherein changing the structure of the hierarchical codebook comprises at least one of (i) updating tier identifiers for the codewords in the hierarchical codebook based on the usage probabilities, wherein the tier identifiers indicate an order of traversing the hierarchical codebook during the codeword selection procedure or (ii) merging two or more of the codewords based on usage probabilities and a similarity of angular direction.

10. The method of claim 9, wherein merging the codewords comprises:
identifying a first codeword with a first angular direction and a first usage probability;
identifying a second codeword with a second angular direction and a second usage probability, wherein the second angular direction is similar to the first angular direction;
merging the first codeword and the second codeword to form a merged codeword with a combined usage probability that is a sum of the first usage probability and the second usage probability; and
providing the merged codeword with an updated tier identifier based on the combined usage probability.

11. The method of claim 8, wherein changing the structure of the hierarchical codebook comprises:
determining (i) whether recent search times for codeword selection procedures differ from historical search times for the codeword selection procedures or (ii) whether recent codeword usage probabilities differ from historical codeword usage probabilities, and
wherein the structure of the hierarchical codebook is changed based on the determination.

12. The method of claim 8, wherein determining the usage probabilities comprises:
identifying codeword usage patterns from a codeword usage history, wherein the codeword usage patterns include a probability that the codeword is selected for communication in a time interval and an average length of time for selecting the codeword.

13. The method of claim 8, wherein the hierarchical codebook comprises a set of best narrow beam codewords for directions within an angular coverage region of wide beam codewords in the hierarchical codebook, wherein each of the set of best narrow beam codewords is a child node of one of the wide beam codewords.

14. The method of claim 8, wherein:
the hierarchical codebook is associated with at least two different branching factors, or
the hierarchical codebook has leaf nodes on at least two different tiers, or
at least one of the codewords is a child node for two or more codewords.

15. A non-transitory, computer-readable medium storing instructions that, when executed by a processor of an electronic device, cause the electronic device to:
determine usage probabilities for codewords in a hierarchical codebook, wherein the codewords are represented by nodes assigned to one of a plurality of tiers of the hierarchical codebook based on a tier identifier;
change a structure of the hierarchical codebook based on the usage probabilities so that nodes associated with codewords having relatively higher usage probabilities are located closer to a root node than nodes associated with codewords having relatively lower usage probabilities; and
select a codeword from the hierarchical codebook for use in wireless communication, wherein the codeword is selected by a codeword selection procedure performed on the changed structure of the hierarchical codebook.

16. The non-transitory, computer-readable medium of claim 15, wherein instructions for changing the structure of the hierarchical codebook include further instructions that, when executed by the processor, cause the electronic device to (i) update tier identifiers for the codewords in the hierarchical codebook based on the usage probabilities, wherein the tier identifiers indicate an order of traversing the hierarchical codebook during the codeword selection procedure or (ii) merge two or more of the codewords based on usage probabilities and a similarity of angular direction.

17. The non-transitory, computer-readable medium of claim 15, wherein instructions to change the structure of the hierarchical codebook the processor include further instructions that, when executed by the processor, cause the electronic device to determine (i) whether recent search times for codeword selection procedures differ from historical search times for the codeword selection procedures or (ii) whether recent codeword usage probabilities differ from historical codeword usage probabilities, and
wherein the structure of the hierarchical codebook is changed based on the determination.

18. The non-transitory, computer-readable medium of claim 15, wherein instructions to determine the usage probabilities include further instructions that, when executed by the processor, cause the electronic device to identify codeword usage patterns from a codeword usage history, wherein the codeword usage patterns include a probability that the codeword is selected for communication in a time interval and an average length of time for selecting the codeword.

19. The non-transitory, computer-readable medium of claim 15, wherein the hierarchical codebook comprises a set of best narrow beam codewords for directions within an angular coverage region of wide beam codewords in the hierarchical codebook, wherein each of the set of best narrow beam codewords is a child node of one of the wide beam codewords.

20. The non-transitory, computer-readable medium of claim 15, wherein:
the hierarchical codebook is associated with at least two different branching factors, or
the hierarchical codebook has leaf nodes on at least two different tiers, or
at least one of the codewords is a child node for two or more codewords.

* * * * *